United States Patent [19]
Sammelman

[11] Patent Number: 6,096,085
[45] Date of Patent: Aug. 1, 2000

[54] COMPUTER-READABLE SOFTWARE AND COMPUTER-IMPLEMENTED METHOD FOR PERFORMING AN INTEGRATED SONAR SIMULATION

[75] Inventor: Gary Steven Sammelman, Panama City Beach, Fla.

[73] Assignee: The United States of America as represented by the Secretary of the Navy, Washington, D.C.

[21] Appl. No.: 09/049,660

[22] Filed: Mar. 23, 1998

[51] Int. Cl.[7] .................... G06F 101/00; G06F 17/11; G06F 9/455
[52] U.S. Cl. ........................... 703/2; 703/9; 703/6
[58] Field of Search ...................... 367/13, 135, 124; 395/500.23, 500.43; 703/5, 9, 2

[56] References Cited

U.S. PATENT DOCUMENTS

| | | | |
|---|---|---|---|
| 4,654,835 | 3/1987 | Feintuch | 367/100 |
| 4,667,199 | 5/1987 | Roberts | 342/169 |
| 4,973,252 | 11/1990 | Krueger | 434/6 |
| 5,235,559 | 8/1993 | Ogushwitz et al. | 367/99 |
| 5,940,523 | 8/1999 | Cornman et al. | 382/100 |

Primary Examiner—Kevin J. Teska
Assistant Examiner—Lonnie A. Knox
Attorney, Agent, or Firm—Harvey A. Gilbert; Donald G. Peck

[57] ABSTRACT

A computer-readable software stored on a storage medium and executed on a computer to perform an integrated sonar simulation, includes a parameter definition code for defining a plurality of parameters of a sonar, target and sonar environment, and a SNR computation code for computing a SNR of the sonar as a function of range to target, based upon the parameters defined by the parameter definition code. The parameters defined by the parameter definition code include ambient noise, volume scattering strength of the sonar environment, sound velocity profile of the sonar, beam patterns of both projector and receiver of the sonar, type of sonar, range resolution of the sonar, number of eigenrays striking the surface and bottom of the sonar environment, number of eigenrays striking the target, ray trajectories to the target, and surface and bottom scattering strength as a function of angle. The software also includes a target strength model generating code for computing scattering from a selected complex target of a stored set of complex target selections, to thereby generate a target strength model for the selected complex target.

26 Claims, 7 Drawing Sheets

FILE HELP SONAR TARGET ENV PATHS SVP RUN PLOT

LOG TS EXIT

FIG. 3

PROJECTOR

| 220 | SOURCE LEVEL (dB) |
| 20 | CENTER FREQ. (kHZ) |
| 10 | BANDWIDTH (kHZ) |
| 3 | # OF SUB BANDS |
| .2 | PULSE LENGTH (ms) |
| 6 | SONAR DEPTH (m) |
| -10 | D/E ANGLE |

CONV. APERTURE ▽ SONAR TYPE
0.075 RANGE RESOLUTION (m)
0.075 CROSS RANGE RESOLUTION (m)

OK
CANCEL

HORIZONTAL    VERTICAL
☐ USER DEFINED   ☐ USER DEFINED
☑ LENGTH         ☐ LENGTH
.15   25   LENGTH/BEAM WIDTH
13    13   SIDE LOBE LEVEL (dB)

FIG. 4

RECEIVER

| 1 | # OF VERTICAL BEAMS |
| -10 | D/E OF CENTER BEAM |

OK
CANCEL

SCANNING BEAM OPTION
☐ ENABLE SCANNING BEAM
29   SCAN DEPTH (m)
1    SCAN OFFSET (deg)

USER DEFINED PITCH
☐ ENABLE PITCH
☐ SIDE SCAN
0    PITCH (deg)

HORIZONTAL    VERTICAL
☐ USER DEFINED   ☐ USER DEFINED
☑ LENGTH         ☐ LENGTH
.15   25   LENGTH
13    13   SIDE LOBE LEVEL (dB)

FIG. 5

```
┌─────────────────────────────────────────────────────────────────────┐
│ TARGET                                                              │
│ ┌───────────────────────────────────────────────────────────────┐   │
│ │ [-20]  TARGET STRENGTH                              [ OK   ]  │   │
│ │ [ 9 ]  TARGET DEPTH                                 [CANCEL]  │   │
│ │                                                               │   │
│ │ TARGET LOCATION vs. RANGE                                     │   │
│ │ [CONSTANT CROSS RANGE ▽]   [     ] CROSS RANGE                │   │
│ │                                    LOCATION (m)               │   │
│ │                            [     ] BEARING (deg)              │   │
│ │                                                               │   │
│ │                            USER DEFINED TARGET                │   │
│ │ BURIED TARGET OPTION         STRENGTH OPTION                  │   │
│ │                            ☐ USER DEFINED                     │   │
│ │ ☐ BURIED TARGET              TARGET STRENGTH                  │   │
│ │ [0.1]  BURIAL DEPTH (m)    ☐ VERTICAL ORIENTATION             │   │
│ │                              TARGET                           │   │
│ │                            [ 90 ]  ORIENTATION (deg)          │   │
│ └───────────────────────────────────────────────────────────────┘   │
└─────────────────────────────────────────────────────────────────────┘
```

FIG. 6

```
┌─────────────────────────────────────────────────────────────────────┐
│ MISC ENV                                                            │
│ ┌───────────────────────────────────────────────────────────────┐   │
│ │ [ 14]  WIND SPEED (KNOTS)                            [ OK  ]  │   │
│ │ [  1]  MARINE LIFE (1-SPARSE, 2-MEDIUM, 3-DENSE)    [CANCEL]  │   │
│ │ [ 20]  TEMPERATURE (C)              ☐ USER DEFINED            │   │
│ │ [ 35]  SALINITY (ppt)                 SURFACE LOSS            │   │
│ │ [  8]  pH                           ☐ USER DEFINED            │   │
│ │                                       VOLUME REVERB           │   │
│ │ [ 40]  USER DEFINED NOISE LEVEL     ☐ USER DEFINED NOISE      │   │
│ │ [-70]  USER DEFINED VOLUME SCATTERING                         │   │
│ │ [  3]  SURFACE LOSS AT NORMAL (dB)                            │   │
│ │ [0.1]  SURFACE LOSS SHIFT                                     │   │
│ └───────────────────────────────────────────────────────────────┘   │
└─────────────────────────────────────────────────────────────────────┘
```

FIG. 7

COMPUTER-READABLE SOFTWARE AND COMPUTER-IMPLEMENTED METHOD FOR PERFORMING AN INTEGRATED SONAR SIMULATION

BACKGROUND OF THE INVENTION

1. Field of the Invention

The present invention generally relates to simulating the performance of sonars on a computer and, more particularly, is concerned with a computer-readable software and computer-implemented method for performing an integrated sonar simulation.

2. Description of the Prior Art

In general, it is highly desirable to be able to model or simulate the performance of sonars on a computer in order to determine the effectiveness of various sonar designs for different operating environments and with respect to different types of targets. A particular operating environment of great importance is a shallow near-shore region of the sea or other body of water, where a sonar is deployed to detect and identify targets, such as submarines and mines, that might be encountered during amphibious assaults. It is also desirable to simulate the performance of sonars in mapping the sea floor in real-time.

Although a wide variety of sonar simulation software are presently available, they suffer from a number of shortcomings and drawbacks. First, none is capable of creating 3-D models of complex target beam scattering profiles as a function of frequency and angle. Second, none have shadow contrast. Third, none takes multipath reflections of transmitted and echo sound waves into account in calculating surface and bottom reverberations and target scattering profiles. Finally, all lack a user-friendly, interactive graphical user interface (GUI) which provides a menu of user input options for defining various parameters of the sonar, target and/or environment, and for inputting data.

Consequently, a need still exists for improved sonar simulation software which will overcome the drawbacks of the prior art without introducing new ones in their place.

SUMMARY OF THE INVENTION

The present invention is designed to satisfy the aforementioned needs by providing a computer-readable software and a computer-implemented method for performing an integrated sonar simulation. The sonar simulation performed by the computer-readable software of the present invention is integrated in the sense that it describes various aspects of the sonar, target and environment. The sonar simulation software is user friendly in the sense that it is written for the widely used Windows application environment in which the user can input and edit data via a GUI having point-and-click icons, pull-down menus, message prompts, and dialog boxes, using a keyboard and mouse connected to a conventional category of widely used personal computers.

Accordingly, the present invention is directed to a computer-readable software stored on a storage medium for causing a computer to perform an integrated sonar simulation. The computer-readable software comprises: (a) a parameter definition code for defining a plurality of parameters of a sonar, target and sonar environment; and (b) a SNR computation code for computing the SNR of the sonar as a function of range to target based upon the parameters defined by the parameter definition code.

The parameters defined by the parameter definition code preferably include ambient noise, volume scattering strength of the sonar environment, sound velocity profile of the sonar, beam patterns of both a projector and receiver of the sonar, type of sonar, range resolution of the sonar, the number of eigenrays which strike the surface and bottom of the sonar environment and which strike the target, ray trajectories to the target, and surface and bottom scattering strength as a function of angle.

The volume scattering strength is preferably calculated in accordance with user-input data regarding the density of marine life in the sonar environment. The parameter definition code preferably uses a selected one of bistatic and monostatic models of surface and bottom reverberations in respectively computing the surface and bottom scattering strengths as functions of angle. The sedimentary composition of the bottom of the sonar environment is preferably taken into account in computing the bottom scattering strength, and the parameter definition code preferably uses a Biot model of different marine sediments to account for bottom penetration to a buried target, in computing ray trajectories to the buried target.

The SNR computation code preferably takes multipath reflections of transmitted and echo sound waves into account in computing the SNR of the sonar. Also, the SNR computation code preferably computes the SNR of the sonar by computing the signal level of each vertical beam of the receiver of the sonar, and then by using the vertical beam having the highest signal level in calculating the SNR of the sonar. The SNR computation code preferably also computes a set of time-varying parameters for each vertical beam of the receiver, including volume reverberation, surface reverberation, total bottom reverberation, and bottom reverberation due to direct path only. Further, the SNR computation code preferably computes the SNR of the sonar for each of a plurality of target ranges, wherein the incremental difference between successive ones of the target ranges is equal to the range resolution of the sonar.

The computer-readable software also preferably comprises a target strength model generating code for computing scattering from a selected complex target of a stored set of complex target selections, to thereby generate a target strength model for the selected complex target. The target strength model generating code preferably computes scattering from the selected complex target by decomposing the complex target into a large collection of rectangular facets which represent the overall shape of the complex target, the edges of the complex target, and a number of point scatterers which represent small protrusions of the complex target, calculating the pressure scattered from each facet, edge and point scatterer, and then coherently summing these calculated pressure contributions.

The present invention also encompasses a method for performing the integrated sonar simulation by providing and then executing the above-defined software of the present invention on a computer.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIGS. 3–11 illustrate a sequence of displays appearing on a monitor of a computer during use of the integrated sonar simulation software of the present invention.

DETAILED DESCRIPTION OF THE INVENTION

Overview of Software

Figure 1A:
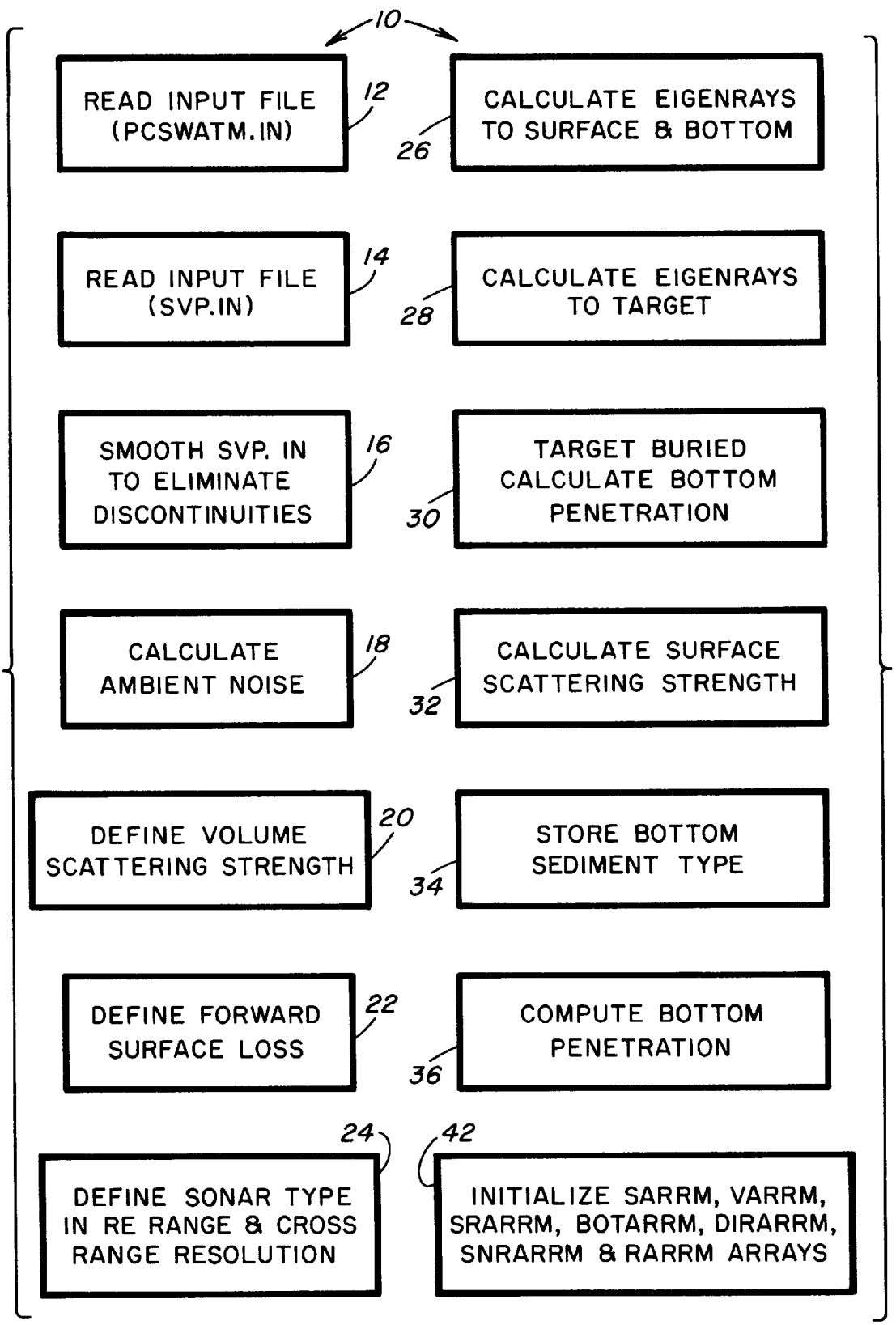
FIGS. 1A and 1B together are a functional diagram illustrating the major functional blocks of computer readable and executable software for performing an integrated sonar simulation in accordance with the present invention.

The present invention relates to computer software stored on a computer-readable storage medium, such as well-known conventional floppy disks, magnetic tape or like media, and capable of execution by a conventional computer, such as any of a variety of well-known personal computers, for modeling and simulating the performance of a desired sonar. The sonar simulation software is user friendly in the sense that it can be written in any known programming language, e.g., C, BASIC, FORTRAN, etc., for the widely used conventional Windows application environment in which users can input and edit data via a conventional GUI having point-and-click icons, pull-down menus, message prompts, and dialog boxes, using a widely-used category of computers with keyboard and mouse connected thereto.

The computer-readable software basically comprises a parameter definition code for defining a plurality of parameters of the desired sonar, target and sonar environment, and a SNR computation code for computing the SNR of the sonar as a function of range to target based upon the parameters defined by the parameter definition code. One implementation of the software is set forth in Appendix A.

The parameters defined by the parameter definition code preferably include ambient noise, volume scattering strength of the sonar environment, sound velocity profile of the sonar, beam patterns of both a projector and receiver of the sonar, type of sonar, range resolution of the sonar, the number of eigenrays which strike the surface and bottom of the sonar environment and which strike the target, ray trajectories to the target, and surface and bottom scattering strength as a function of angle.

The volume scattering strength is preferably calculated in accordance with user-input data regarding the density of marine life in the sonar environment. The parameter definition code preferably uses a selected one of bistatic and monostatic models of surface and bottom reverberations in respectively computing the surface and bottom scattering strengths as functions of angle. The sedimentary composition of the bottom of the sonar environment is preferably taken into account in computing the bottom scattering strength, and the parameter definition code preferably uses a Biot model of different marine sediments to account for bottom penetration to a buried target, in computing ray trajectories to the buried target.

The SNR computation code preferably takes multipath reflections of transmitted and echo sound waves into account in computing the SNR of the sonar. Also, the SNR computation code preferably computes the SNR of the sonar by computing the signal level of each vertical beam of the receiver of the sonar, and then by using the vertical beam having the highest signal level in calculating the SNR of the sonar. The SNR computation code preferably also computes a set of time-varying parameters for each vertical beam of the receiver, including volume reverberation, surface reverberation, total bottom reverberation, and bottom reverberation due to direct path only. Further, the SNR computation code preferably computes the SNR of the sonar for each of a plurality of target ranges, wherein incremental differences between successive ones of the target ranges is equal to the range resolution of the sonar.

The computer-readable software also preferably comprises a target strength model generating code for computing scattering from a selected complex target of a stored set of complex target selections, to thereby generate a target strength model for the selected complex target. The target strength model generating code preferably computes scattering from the selected complex target by decomposing the complex target into a large collection of rectangular facets which represent the overall shape of the complex target, the edges of the complex target, and a number of point scatterers which represent small protrusions of the complex target, calculating the pressure scattered from each facet, edge and point scatterer, and then coherently summing these calculated pressure contributions.

Detailed Description of Software

Figure 1B:
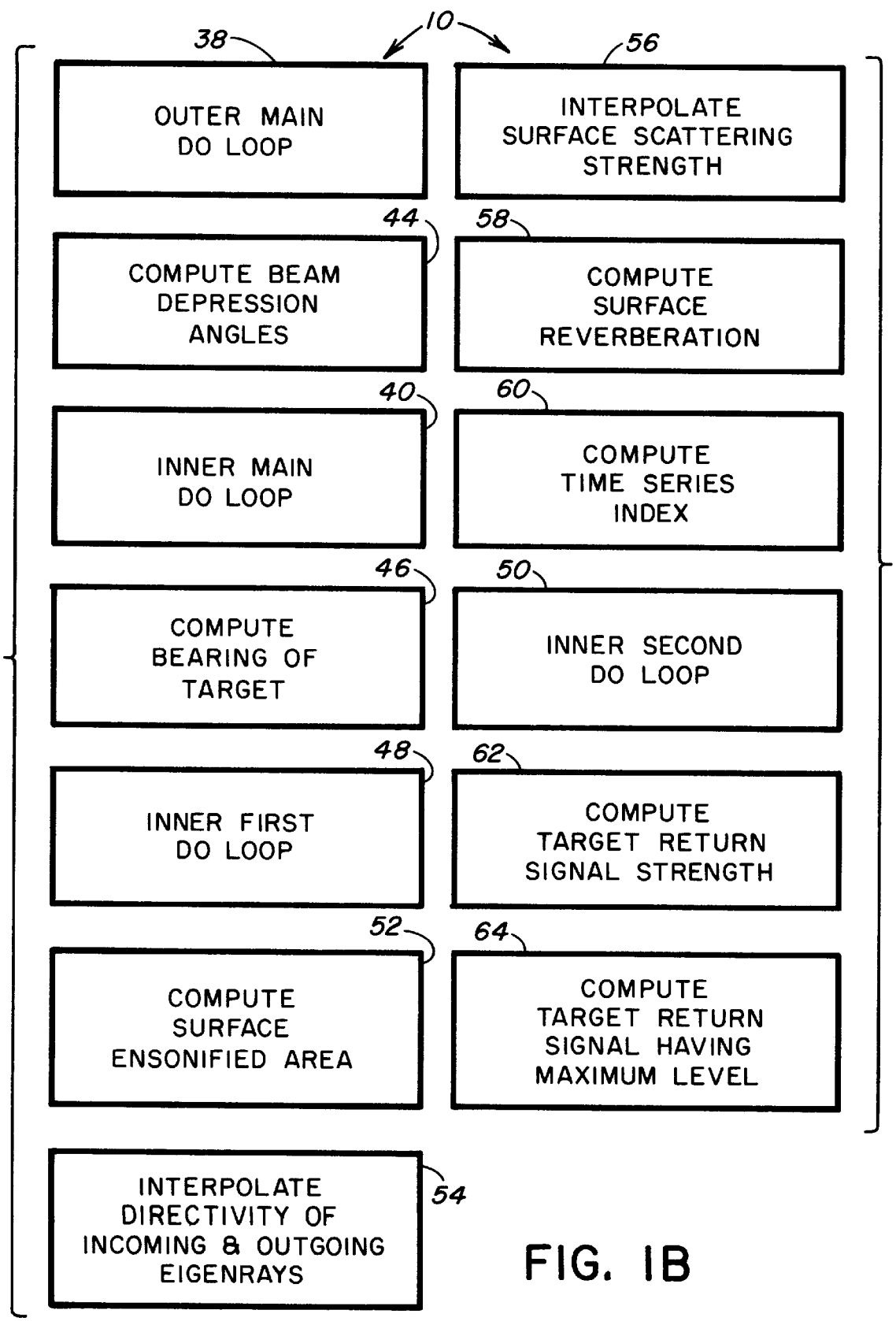

Referring to the drawings and particularly to FIGS. 1A and 1B, there is illustrated a functional block diagram of the computer-readable and executable software, generally designated 10, of the present invention for performing an integrated sonar simulation. The sonar simulation performed by the computer-readable software 10 of the present invention is integrated in the sense that it describes various aspects of the sonar, target and environment.

To begin using the parameter definition code for defining the parameters of the sonar to be modeled by a user using the integrated sonar simulation, as per block 12 a first input file of the software 10, designated pcswatm.in, is read from the memory (not shown) of a computer (not shown) in which the software 10 of the present invention has been loaded and stored. After loading, the input file is checked for errors and corrected if any errors are found.

As per block 14, a second input file of the software 10, designated svp.in, the sound velocity profile of the sonar being simulated, is read from the memory of the computer. After loading, this input file is checked for errors and corrected if any errors are found. Any discontinuities in the svp.in are eliminated by a smoothing algorithm, as per block 16.

Next, as per block 18, the software 10 calculates the ambient noise surrounding the sonar (as attenuation loss per meter), e.g., using a SEARAY model of ambient noise. This model incorporates noise due to surface agitation and thermal noise. Alternatively, the user can override the default and enter a user-defined value for the noise spectral density. In this connection, if a parameter, iambient, is set by the user to equal 0, then the software 10 calls a function (subroutine) designated ambient_noise to calculate the noise spectrum of the ambient noise. If the parameter, iambient, is set by the user to equal 1, then the software 10 sets the noise spectrum of the ambient noise equal to the user-specified level amb_in. Preferably, the ambient noise is divided by the time bandwidth product (BT) if the user specifies that the sonar is a real aperture sonar which uses matched filter processing.

Next, as per block 20, the software 10 defines the volume scattering strength. More particularly, if a parameter designated ivolume is set by the user to equal 0, the software 10 sets the volume scattering strength to an appropriate level in accordance with an integer ivolscat, which is set to a value of 1 for a sonar environment in which the marine life is sparse; a value of 2 for a sonar environment in which the marine life is of medium density; and a value of 3 for a sonar environment in which the marine life is dense. If the parameter ivolume is set by the user to equal 1, then the software 10 utilizes the user-defined value vol_in for the volume scattering strength.

Next, as per block 22, the software 10 defines the forward surface loss, e.g., in accordance with an equation:

(loss in dB)=(loss in dB at normal incidence)(1+fshft)/(sin(theta)+ fshft), where theta is the grazing angle at the surface, and fshft is a user-specified cut-off parameter.

Next, as per block 24, the software 10 allows (e.g., prompts) the user to choose between three (or more) different sonar types, e.g., real aperture, synthetic aperture, and constant resolution sonar. The primary difference in the way that the software 10 treats these three sonar types is in the assignment of the range and cross-range resolution of the sonar.

In the case of a real aperture sonar system, the software 10 computes the cross-range resolution of the sonar in accordance with the following equation:

cross-range resolution=(path length)(horizontal beam width in radians), where the software 10 chooses the minimum of the projector and receiver beam width. The software 10 also prompts the user to choose whether or not the sonar uses matched filter processing, e.g., by assigning an appropriate value (0 or 1) to an integer variable designated icoherent. If the user does not choose matched filter processing, then the software 10 computes the range resolution of the sonar in accordance with the following equation:

range resolution=(speed of sound)(pulse length)/2.

If the user chooses matched filter processing, then the software 10 computes the range resolution of the sonar in accordance with the following equation:

range resolution=(speed of sound)(band width)/2.

In the case of either synthetic aperture or constant resolution sonar, the range and cross range resolutions are specified by the user. In this regard, if an integer variable designated isas_mode is set by the user to equal 0, then the software 10 assumes a real aperture sonar, and the software next checks the integer variable icoherent in order to determine if the user has selected matched filter processing.

Next, as per block 26, a subroutine of the software 10 designated fitraysrf (fitraybot) is used to access data stored in a common memory block regarding eigenrays to the surface (bottom). The range at which the eigenrays should strike the surface (bottom) is the only input to the subroutine fitraysrf (fitraybot). The output from this subroutine is the number of eigenrays striking the surface (bottom) at this user-input range, launch angle, grazing angle at the endpoint of the eigenrays, travel time, and intensity of the eigenrays. Which eigenrays strike the surface (bottom) at a particular range is determined by sorting through each family of eigenrays and finding two adjacent eigenrays which bound the desired range. A linear interpolation in range is then performed.

Next, as per block 28, the software 10 calculates the eigenrays to the target in a similar manner as it calculates the eigenrays to the surface and bottom, as described above. In this case, the surface the eigenrays must strike is the horizontal surface which passes through the depth of the target. This makes it possible to interpolate in range between two neighboring eigenrays to find an approximate value for the eigenray which strikes the target at a particular range.

If a parameter designated iburied is set by the user to equal 0, then the software 10 assumes the target is within the water column and it calls the functions (subroutines) designated init_raytrg and init_raytrg_vtx to calculate the ray trajectories to the target. If the parameter iburied is set by the user to equal 1, then the software 10 assumes the target is buried and it calls the functions (subroutines) designated init biot, init_penetration, and init_raybur_vtx, to calculate the ray trajectories to a buried target, as per block 30. The functions init_Biot and init_penetration calculate the amount of bottom penetration to the target as a function of grazing angle and stores them in a common memory block (not shown) in the simulation computer (not shown) in which the software 10 is installed, where they are used in computing the intensity of the signal from the buried target. The software 10 assumes a point target with a user-specified target strength for its buried target. This model neglects such effects as the sediment loading on the target strength, and mode conversion due to scattering one mode off the target into a different mode.

As per block 32, in the software 10 the surface scattering strength is preferably precomputed by a function (subroutine) designated init_rev94 which uses APL/UW's (Applied Physics Laboratory at University of Washington) 9407 model of surface reverberation and stores the scattering strength as a function of angle in a common memory block. The software 10 approximates bistatic reverberation from the surface by taking the scattering strength at the average of the incoming and outgoing angles. This average scattering strength is then utilized in calculating multipath contributions to surface reverberation. In calculating bistatic bottom reverberation, the software 10 allows (e.g., prompts) the user to make the choice of either using the same method utilized in calculating surface reverberation in the calculation of bistatic bottom reverberation, or to use APL/UW's bottom scattering model.

The software 10, as per block 34, then calls the function (subroutine) designated init_bot_bi, which stores the sediment parameters for APL/UW's bottom reverberation models in a common block. If a parameter designated ibot_bi is set by the user to equal 0, then the software 10 calls the functions (subroutines) init_bot_rev and init_refl_bot. The function init_bot_rev preferably uses APL/UW's monostatic model of bottom reverberation and it stores the scattering signal as a function of grazing angle in a common memory block. If the parameter ibot_bi is set by the user to equal 1, then the software 10 calls the functions (subroutines) init_bot_rev_bi and init_refl_bot. The function (subroutine) init_bot_rev_bi computes the bistatic scattering strength as a function of the incident and outgoing grazing angles and stores them in a common memory block.

The software 10, as per block 36, then uses a Biot model of marine sediments to account for bottom penetration to a buried target. The bottom penetration model uses Biot's theory to compute the amount of energy present in the fast, slow, and shear waves at a given depth, for a given grazing angle. The software 10 determines which wave has the largest bottom penetration at a given depth and it returns that value for the bottom penetration. This bottom penetration model was derived by empirically matching the Biot parameters of the model to the speed of the fast wave, attenuation of the fast wave, and the density of the sediment for 18 different bottom types ranging from rock to silt.

The software 10 now begins to utilize the SNR computation code to compute the SNR of the sonar which the user desires to model. In general, this portion of the software 10, hereinafter referred to as the "SNR computation module", computes the SNR of the sonar as the target is moved in range. The SNR computation module discretizes time into a discrete sequence of increments equal to the range resolution of the sonar.

The SNR computation module is primarily comprised of two nested (outer and inner) main Do loops, generally designated 38, 40. The outer main Do loop 38 is a Do loop over each vertical beam in the receiver of the sonar. The vertical beams are symmetrically arranged about the depression angle (phi_mid) of the receiver. The vertical beams are separated by the beam width of the receiver. The depression angle of the vertical beams is initialized to the value of a variable phi_steer_r defined by the user.

Prior to the execution of the outer main Do loop 38, as per block 42 a plurality of one-dimensional arrays designated sarrm, varrm, srfarrm, botarrm, dirarrm, snrarrm, and rarrm, are initialized. The sarrm array contains data representative of the signal level of the sonar return signal (echo). The varrm array is representative of the level of volume reverberation. The srfarrm array is representative of the level of surface reverberation. The botarrm array is representative of the level of total bottom reverberation. The dirarrm array is representative of the level of bottom reverberation due to direct path only. The snrarrm array is representative of the SNR of the sonar. The rarrm array is representative of the range of the sonar. The values of these arrays change with each vertical beam produced by the sonar. The SNR computation module compares the signal level of the previous vertical beam stored in the sarrm array with the signal level of the current vertical beam, and, if the current signal level is greater than that of the previous signal level, updates all of the above-described arrays with the current values of the various parameters represented thereby, i.e., volume reverberation, surface reverberation, total bottom reverberation, bottom reverberation due to direct path only, and SNR of the sonar.

The first code block 44 of the outer main Do loop 38 computes the beam depression angles, and begins by executing a function (subroutine) designated rotateb, for both the projector and receiver of the sonar system. If the sonar pitch is zero, then the user inputs a value of zero (0) for a variable designated ipitch, and the function rotateb sets the variables phip (representing the beam depression angle of the projector) and phir (representing the beam depression angle of the receiver) to the user-input values phi_steer_p and phi_steer_r. If the sonar pitch is not zero, then the user inputs a value of one (1) for the variable ipitch, and the functiion rotateb sets the beam depression angles phip and phir to a calculated rotated depression angle for the user-defined pitch and variables phi_steer_p and phi_steer_r specifying the depression angle of the projector and receiver, respectively.

The rotated values of phip and phir are dependent upon the user-defined value of a parameter designated isonar, which indicates whether the sonar is a forward-looking sonar or a side-scan sonar. The axis of rotation for these two sonar types is different. In the case of a forward-looking sonar, changing the pitch of the sonar simply changes the depression angle of the projector (phip) and receiver (phir) by an equal amount. In the case of a side-scan sonar, the depression angles phip and phir are determined by a 3-dimensional rotation perpendicular to the direction of travel of the sonar. A non-zero yaw of the sonar can be easily simulated by changing the bearing of the target. It should be noted that the calculated values of phip and phir are only used in calculating the directivity index of the sonar for surface and bottom reverberation. Calculating the directivity index of the target is more complicated, since the target may not be in the same plane as the main beam of the sonar.

The inner main Do loop 40 of the SNR computation module of the software 10 is a Do loop over the horizontal range from the sonar to the target. It is within this inner main Do loop 40 that the signals levels from the target, the surface, and the bottom, and volume reverberations, are calculated.

The first code block 46 within the inner main Do loop 40 computes the bearing (bearing) of the target at a specific range (range) based on the user-defined value of a variable designated ibearing. If ibearing is set to zero (0), then the software 10 calculates the target bearing (bearing) at the specified range in accordance with the following equation:

$$\text{bearing}=\text{atan2}(\text{tgt\_cross},\text{range})*180/\text{pi},$$

where tgt_cross is a user-specified value for the displacement of the target from the sonar. If ibearing is set to one (1), then the bearing of the target is set equal to a user-specified constant tgt_bearing.

The computation of surface reverberation at the specified range begins with a call to a subroutine designated fit_raysrf, which interpolates between adjacent eigenrays to obtain those eigenrays which strike the surface at the specified range. This subroutine returns an integer value for a variable designated nray which specifies the number of ray paths to the surface, and values for an array designated thi1 (representing the launch angle of each eigenray), an array designated thf1 (representing the final grazing angle of each eigenray), an array designated ampl (representing the intensity of each eigenray), and an array designated time1 (representing the travel time of each eigenray).

The computation of the contributions of each multipath to surface reverberations is performed within an inner first one 48 of an additional pair of nested Do loops located within the inner main Do loop 40, and the computation of the contributions of multipath to bottom reverberation is performed within an inner second one 50 of the additional pair of nested Do loops located within the inner main Do loop 40. This additional innermost pair of nested Do loops 48, 50 computes the contributions of each multipath to surface reverberation and bottom reverberation, respectively, over the nray eigenrays found by the subroutine f_rasrf. The first Do loop 48 of this innermost pair of nested Do loops sums the surface reverberation over incoming and outgoing eigenrays, as a function of time. The second Do loop 50 of this innermost pair of nested Do loops sums the bottom reverberation as a function of time over incoming and outgoing eigenrays, as a function of time.

The first code block 52 within the first Do loop 48 computes the ensonified area (Area) on the surface in accordance with the following equation:

$$\text{Area}=\text{theta\_beam}*\text{r\_out}*\text{drange},$$

where theta_beam is the minimum horizontal beam width of the projector and receiver, r_out is the slant range of the outgoing eigenray, and drange is the range resolution of the sonar. The next code block 54 within the first Do loop 48 executes functions (subroutines) designated Compute_di2_p and Compute_di2_r, which interpolate the directivity index di1 and di2 of the incoming and outgoing eigenrays, respectively, and the depression angles phip and phir of the projector and receiver, respectively. The next code block 56 within the first Do loop 48 performs an interpolation of the surface scattering strength (compute_surf_rev) of the surface at the average grazing angle, by executing a function (subroutine) called Compute_surf_rev. The next code block 58 within the first Do loop 48 approximates bistatic reverberation from the surface by taking the average of the incoming and outgoing grazing angle of the surface. The contribution (dsum) of this pair of multipaths (i.e., surface scattering and bistatic reverberation) to surface reverberation is then computed in accordance with the following equation:

$$dsum=Amp\_srf*Area*Amp\_out*Amp\_in*direct*compute\_surf\_rev(thetaw),$$

where Amp_srf is equal to the source level of the sonar in micropascals, Amp_out and Amp_in are the intensity of the incoming and outgoing eigenrays, and direct is equal to the product di1*di2*di2*di2, wherein di1 and di2 are the directivity index of the incoming and outgoing eigenrays, respectively, and thetaw is the average of the incoming and outgoing grazing angle of the surface. The next code block 60 within the first Do loop 48 computes the index n0 of the time series of the first Do loop 48 in accordance with the following equation:

$$n0=(r\text{-tmin})/dtime+1,$$

where r is the average travel time of the incoming and outgoing eigenrays in meters, and dtime is the time increment of the arrays in meters (equal to the range resolution (drange) of the sonar). If n0 is greater than 1 and less than ntime_reverb, then dsum is added to th array element srfarr(n0). In this manner, reverberation is calculated as a function of time.

The second Do loop 50 of the innermost pair of nested Do loops of the inner main Do loop 40 computes bottom reverberation similarly to the above-described computation of surface reverberation by the first Do loop 48 of this pair, with the following exceptions. First, a subroutine Compute_ndirect is called, which returns an integer value for a variable ndirect which represents the index of the eigenray representing the direct path to the bottom. If this integer is non-zero, the contribution of the direct path specified by this eigenray is added to the array dirarr(n0) representing the bottom reverberation due to the direct path. Second, if a user-defined variable ibot_bi is set a 0, a function (subroutine) Compute_bot_rev is called to compute bottom reverberation based upon a suitable monostatic model (e.g., of the type developed by APL/UW), and the average grazing angle of the incoming and outgoing eigenrays. If ibot_bit is set to 1, a function (subroutine) Compute_bot_bi is called to compute the bottom scattering strength based upon a suitable bistatic model (e.g., of the type developed by APL/UW), and the average grazing angle of the incoming and outgoing eigenrays. In either case, the computation of bottom reverberation over the incoming and outgoing eigenrays, as a function of time, completes the second Do loop 50 of the innermost pair of nested Do loops of the inner main Do loop 40.

After completion of the second Do loop 50 of the innermost pair of Do loops of the inner main Do loop 40, the software 10 proceeds to the next portion 62 of the inner main Do loop 40, which computes the value (strength) of the return signal from the target. Since the target has finite extent and is usually small relative to water depth, multipaths from the target are generally non-overlapping and they are not added as they are in the case of computing the surface and bottom reverberations. Instead, the software 10 computes which eigenray produces the largest signal from the target, and that signal is used as the signal from the target.

The computation of the strength of the signal from the target begins with a call to a subroutine designated fit_raytrg, which returns an interpolation of the eigenrays to the target at the specified range (range). The program then calls a subroutine (designated "rotate") for both the projector and receiver, which computes the depression angle and yaw of the main beam launched by the sonar, based upon the pitch of the sonar.

The next code block 64 of the inner main Do loop 40 computes the signal level due to each pair of eigenrays to determine which pair of eigenrays yields the return signal from the target having the maximum level. The return signal having the maximum level is added to the array element sarr(n0), where n0 represents the average travel time of the incoming and outgoing eigenrays, as previously mentioned. The approximate volume reverberation is computed in accordance with the following equation:

$$Vol=Amp\_vol*Vol\_scat*Amp\_in*Amp\_out*(hbeam*drange*r*r),$$

where Amp_vol is the source level of the sonar in micropascals, Vol_scat is the volume scattering strength, Amp_out and Amp_in are the intensity of the outgoing and incoming eigenrays, respectively, hbeam and vbeam are the minimum horizontal and vertical beam widths of the sonar (in radians), respectively, drange is the range resolution of the sonar, and r is the average of the total distance traveled by the incoming and outgoing eigenrays.

The computation of volume reverberation completes the inner main Do loop 40 over range. In between the end of the inner main Do loop 40 over range and the end of the outer main Do loop 38 over each vertical beam in the receiver, is a Do loop over time, which compares the SNR curves for the current vertical beam with the maximum of the previous vertical beams. If the signal level of the current vertical beam is greater than that of the previous beam, the current signal and reverberation levels are stored in the arrays sarrm, snrarrm, srfarrm, botarrm, varrm, dirarrm, and rarrm, as the maximum SNR signal (beam) and reverberation levels of the sonar. The calculation of the beam having the maximum SNR and reverberation levels of the sonar completes the outer main Do loop 38 over the vertical beams. Finally, the SNR computation module of the software 10 then records the signal and reverberation levels as a function of range in a data output file designated pcswatm.out.

Figure 2:
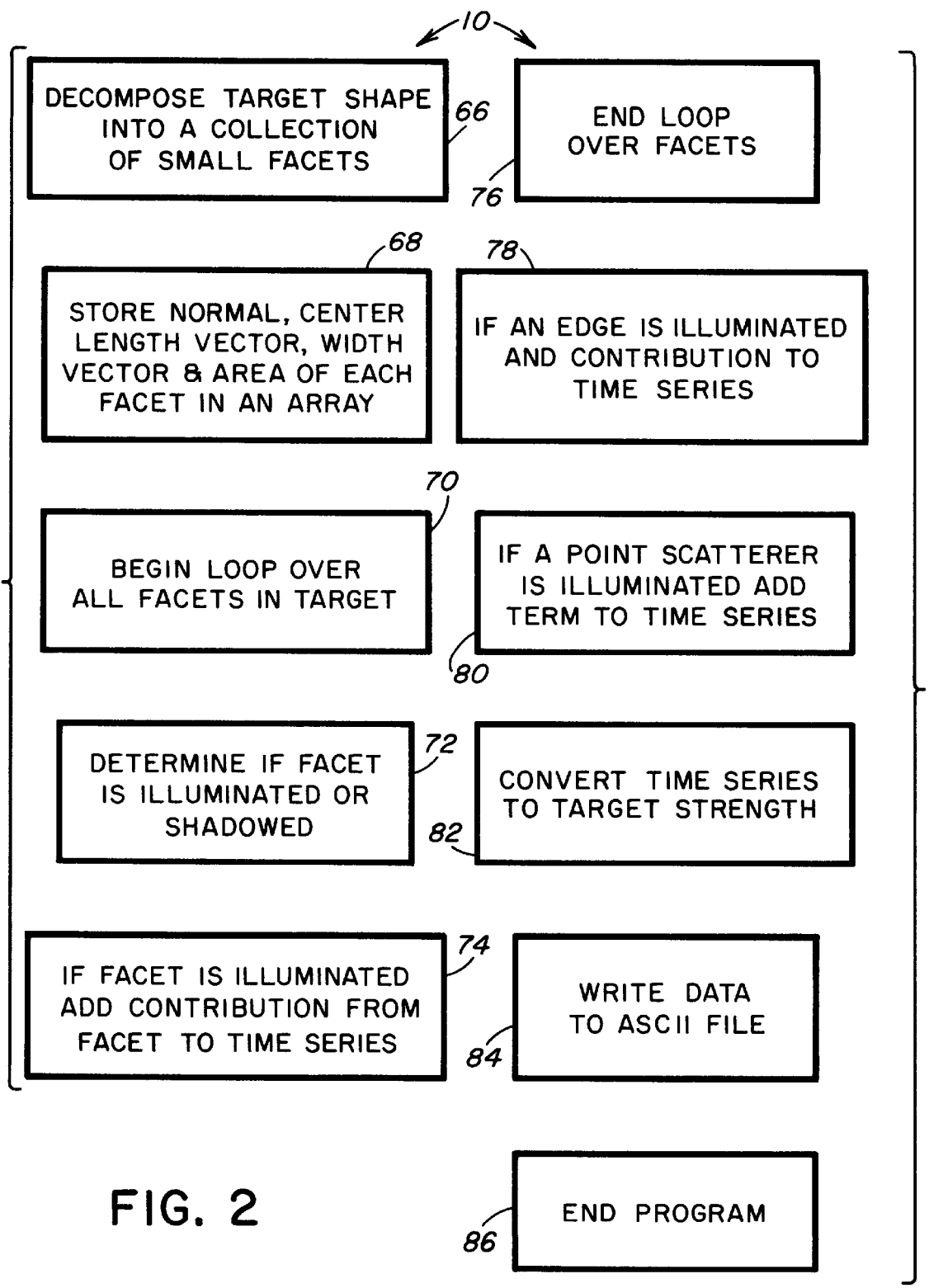
FIG. 2 is a functional diagram illustrating the major functional blocks of a target strength model module of the integrated sonar simulation software of the present invention.

With reference now to FIG. 2, there is illustrated a functional block diagram of another portion (source code block) of the integrated sonar simulation software 10 of the present invention, which is designed to give the user a quantitative picture of the intensity of sound scattered from a complex target, as a function of frequency and angle. This portion of the software 10, which will hereinafter be referred to as the "target strength model module" and is comprised of blocks 66–86, provides the user with a choice of several different complex targets which can be modelled (i.e., a set of complex target selections). Exemplary complex targets include a prolate spheriod, a generic mine, a cylinder with a flat end and caps, and a cylinder with hemi-spherical end caps.

Conceptually, the target strength model is generated by decomposing the complex target selected to be modelled into a large collection of rectangular facets which represent the overall shape of the target, the edges of the target, and a number of point scatterers which represent small protrusions such as bolts. The pressure scattered from each facet, edge, and point scatterer is summed coherently to obtain the total pressure scattered by the target. This method of computing the scattering from a complex target has been validated against several different targets, including a mine.

The source code for generating the target strength model utilizes the following sequence of algorithms. The pressure scattered from each surface of the decomposed complex target is approximated in accordance with the following equation:

$$P_{scat} = \frac{ik}{2\pi rr''} \cdot e^{ik(r+r'')} \cdot \int\int d^2 r' e^{-i\vec{k}\cdot(\vec{r}-\vec{r}'')}\{(1+R)\nabla_n r - (1-R)\nabla_n r''\}$$

where r is a vector from the point source to the origin, r' is a vector from the origin to the receiver, r" is a vector from the origin to a point on the surface, k is the wavenumber of the acoustic field, and R is the reflection coefficient of the surface. In the case of back scattering from a rectangular surface (facet), the equation above reduces to the following simple equation:

$$P_{scat} = \frac{2ik}{4\pi r^2} R \cdot \cos(\theta) \cdot \text{Area} \cdot \frac{\sin(X)}{X} \cdot \frac{\sin(Y)}{Y} \cdot e^{2ikr}$$

where $$X = kl\sin(\beta)\cos(\phi)$$
$$Y = kw\sin(\beta)\sin(\phi)$$
$$P_{scat} = D(\theta)/\sqrt{kr(1+r/p)} \cdot e^{2ikr}/r$$

where $$D(\theta) = \sqrt{\frac{\pi}{2}} \cdot e^{2ikr} \cdot \frac{\sin(\pi^2/\alpha)}{\alpha\sin(\beta)}$$

$$\left\{\{\cos(\pi^2/\alpha) - \cos\left(\frac{\pi}{\alpha}(\pi+2\partial)^{-1}\right) + \{\cos(\pi^2/\alpha) - 1\}^{-1}\right\}$$

where 1 is the length of the facet, w is the width of the facet, q is the angle between the length of the facet and the incoming ray in the plane of the facet.

The pressure scattered from an edge is computed using Keller's edge diffraction coefficent from the Geometric Theory of Diffraction. The scattering from a point scatterer is computed in accordance with the following equation:

$$P_{scat} = \frac{a}{2} \cdot e^{2ikr}/r^2$$

where a is the radius of the small protrusion the point scatterer represents.

The contributions from the facets, edges, and point scatterers are summed coherently to obtain the total pressure arriving at the receiver, to thereby provide a model of the chosen complex target.

Using Software on Personal Computer

The software of the present invention is a high frequency sonar performance prediction model of the shallow water environment and, more specificallly, is a shallow water acoustic toolset which has been optimized for shallow water environment and designed to be run on a personal computer. For the specific implementation contained in Appendix A, the minimum requirement for the software is a 486DX personal computer with 8 to 16 MB of RAM running Windows 3.1, Windows 95, or Windows NT 3.51.

As one of its features, the program code of the software computes the SNR of an arbitrary sonar. It constructs three-dimensional beam patterns for the projector and receiver of the sonar. This allows a target to be placed at an arbitrary position relative to the main beam of the sonar. The software allows the user to import the actual target strength pattern of a mine case, and the measured beam pattern of an actual sonar. This allows the user to estimate the SNR of a particular sonar against a particular mine type. The user may also choose to estimate the SNR of a buried target by specifying the average burial depth of the target. The user can use either the Biot Stoll model of bottom penetration or APL/UW's 9505 model of bottom penetration in the calculation of the scattering from a buried target. The user can select one of 18 predefined bottom types, or create his own bottom type by altering the parameters of any of these bottom types. Also, the software includes multipath contributions in the computation of bottom and surface reverberation. Further, among other options available to the user, the user can compute the target strength pattern of a number of three-dimensional targets, compute bottom and surface scattering strength for varying environments, generate a ray trace of an arbitrary sound velocity profile, and study bottom penetration of varying sediments.

The software includes approximately two dozen programs, which are controlled by a GUI. The software communicates between programs by passing ASCII files. The default input files for the software are the files pcswatm.in and svp.in. The file pcswatm.in contains all the input parameters selected by the user for the SNR program. The file svp.in contains the sound velocity profile.

The use of the integrated sonar simulation software of the present invention will now be described with reference to the following example of a sonar, target and sonar environment. The sonar is a 20 kHz real aperture sonar with a projector having a 10 kHz bandwidth and a pulse length of 0.2 msec. Both the projector and receiver are 0.15 meter in length and have a vertical beamwidth of 25 degrees. The D/E angle for both the projector and receiver is 10 degrees down. The side lobe levels is +13 dB for rectangular elements. The sonar operates at a depth of 6 meters in 10 meters of water. Lacking an svp, it is assumed to have an isovelocity sound velocity profile. The wind speed is 14 knots, and the bottom type is medium sand. The target has a target strength of −20 dB and is located at a depth of 9 meters.

From the menu options displayed on the bar shown in FIG. 3, the user selects the Sonar menu and from it selects the Projector command option. This command brings up the display depicted in FIG. 4. Using a keyboard, the user enters 220 dB for the source level, 20 kHz for the frequency, 10 kHz for the bandwidth, 0.2 msec for the pulse length, 6 meters for the sonar depth, and −10 degrees for the D/E angle. The user selects the length check box under the horizontal beam pattern and enters 0.15 meters for the length of the projector and +13 dB for the side lobe level. The user unselects the length box under the vertical option and enters the vertical beamwidth as +25 degrees with a +13 dB side lobe level. The user selects the conventional aperture sonar from the combo box. The user must make sure that the User Defined check boxes are not selected, otherwise the software will attempt to read either hprj.in or vprj.in for a user specified beam pattern. The entries under range and cross range resolution are disregarded for conventional aperture sonars. They have significance only if the user selects the synthetic aperture sonar or constant resolution sonar options in the combo box. The user then clicks the OK button to save the entries.

Next, the user returns to the Sonar menu and selects the Receiver command option. FIG. 5 shows the display created by selection of this command. The user enters 1 for the number of vertical beams, and −10 degrees for the D/E angle. Under the horizontal beam pattern the user selects the length box and enters 0.15 meters for the length of the receiver and +13 for the side lobe level. The user must make sure that the user defined check boxes are not selected, otherwise the software will attempt to read the files hrec.in and vrec.in for a user defined beam pattern. Also, the user must make sure that neither the enable pitch nor the enable scanning beam check boxes are selected. The enable pitch option allows the user to tilt the axis of the sonar away from horizontal, and the enable scanning beam option allows the user to steer the receive beam to a fixed depth as a function of travel time. Neither of these will be used in this example. Lastly, the user will click the OK button to save the entries.

Next, the user returns to the menu options displayed on the bar shown in FIG. 3 and selects the Target option. FIG. 6 depicts the display created by selection of this option. The user enters −20 dB for the strength of the target, and 9 meters for the target depth. In this case, the user can select a target at either constant cross range or constant bearing from the combo box, and enter 0 for the bearing and the cross range of the target. This option enables the user to displace the target by either a constant offset or constant angle away from the main beam of the sonar. By entering 0 for the cross range and bearing of the target, the user is selecting the option that the target is in the vertical plane of the main beam. Again, the user must make sure that the user defined target strength check box is not selected. If this check box is selected the software will attempt to read a user defined target strength pattern for the target. The user unchecks the buried target and then, finally, clicks the OK button to save the entries.

Again, the user returns to the menu of options displayed on the bar shown in FIG. 3 and now selects the Env (environment) menu option. From this menu, the user selects the Misc command option. This option contains all the environmental information except the sound velocity profile and the bottom type. FIG. 7 depicts the display created by this command. The user enters 14 knots for the wind speed, 20 degrees Celsius for the temperature, 35 parts per thousand for the salinity, 8 for the pH, and 1 for the density of marine life. Left unchecked are the user defined surface loss, the user defined noise levels, and the user defined volume reverb check boxes. The remaining entries are only significant if one of these 3 check boxes is selected. The OK button is clicked to save the entries.

Figure 8:
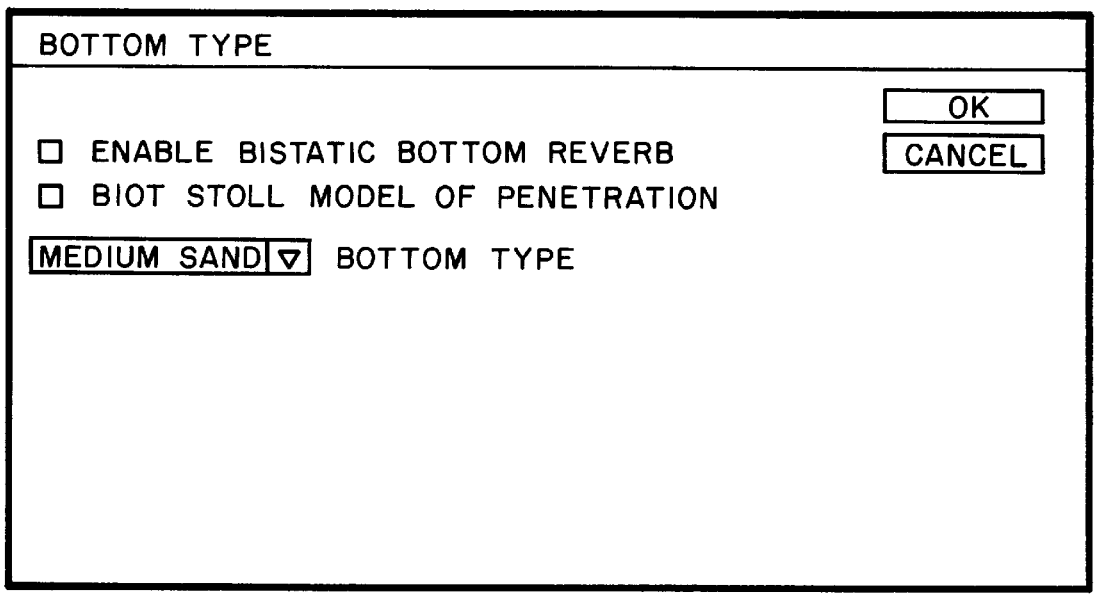

From the Env menu, the user selects the Bottom command option. FIG. 8 depicts the display created by this command. The user selects for entry the medium sand from the combo box and leaves unchecked the bistatic and biot stoll check boxes. Finally, the OK button is clicked to save the entries.

Figure 9:
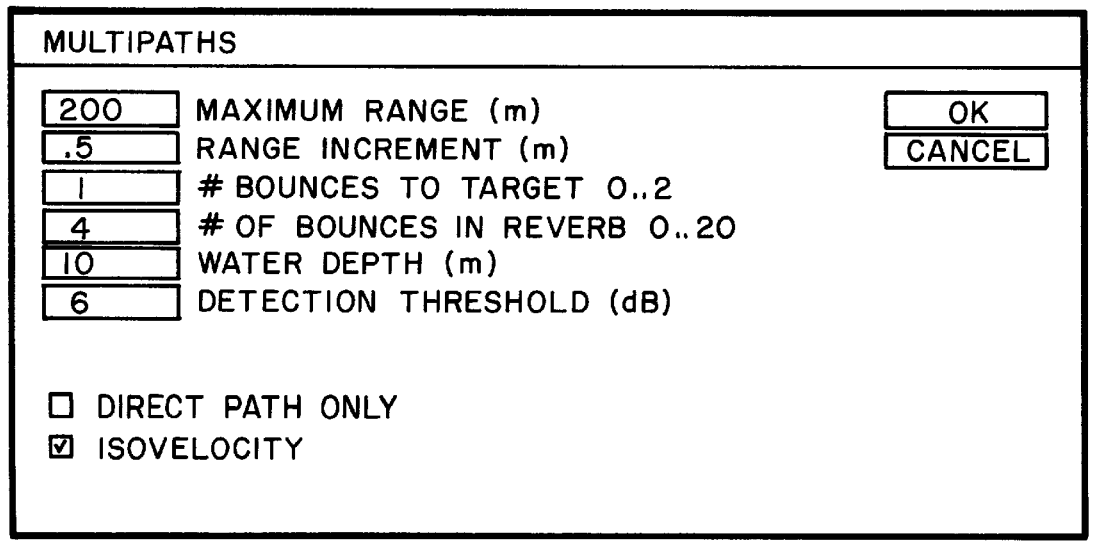

Again, the user returns to the menu options displayed on the bar shown in FIG. 3 and now selects the Paths command option. FIG. 9 depicts the display created by this command. The user enters 200 meters for the maximum range, 0 meters for the range increment, 1 for the number of bounces to the target, 4 for the number of bounces in the reverberation computation, 10 meters for the water depth, and 9 dB for the detection threshold. The user selects the isovelocity check box to enable the isovelocity svp and bypass the file svp.in. Left unchecked is the direct path only check box to enable the multipaths in the target signal and reverberation computations. Note the range increment only affects the spacing between points in the output file and not the speed of the program. By entering 0 meters for the range increment, the software will write all computed range increments into the file pcswatm.out. Finally, the OK button is clicked to save entries.

Figure 10:
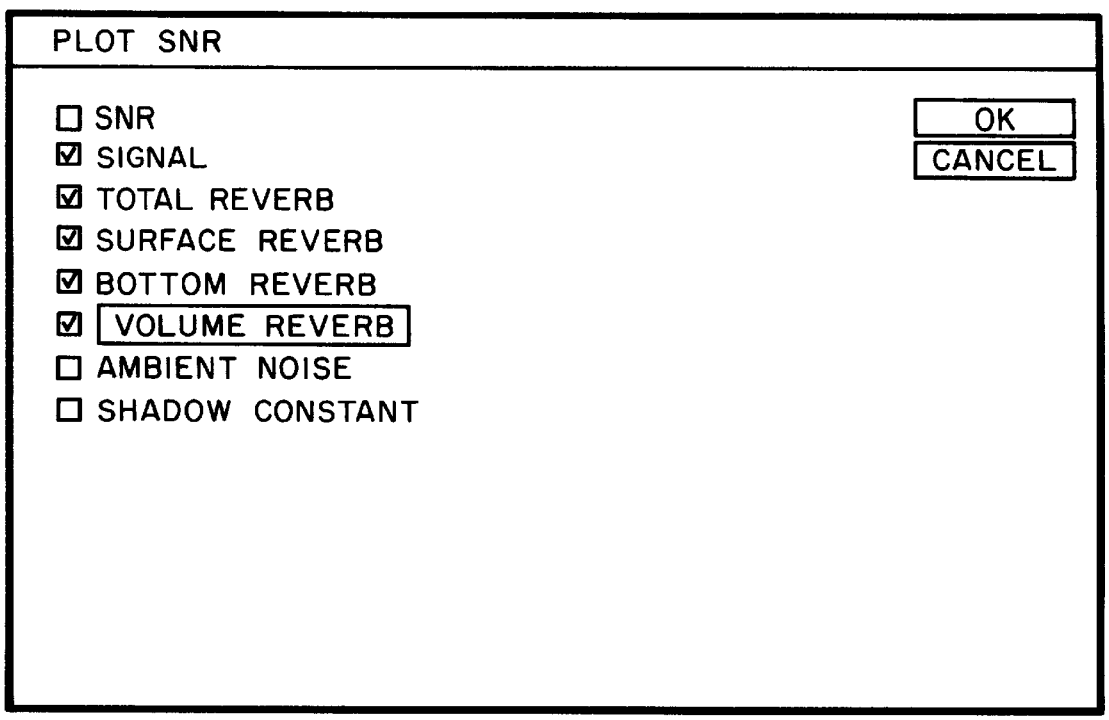

The user is now ready to run the SNR simulation. The user returns to the menu options displayed on the bar shown in FIG. 3 and now selects the Run menu. From the Run menu, the user selects the SNR command option which creates the display depicted in FIG. 10. The user is prompted and will answer "yes" to save the input values in the file pcswatm.in. The simulation then continues. An indication of the progress of the running of the simulation as well as the number of multipaths and SNR will appear on the display monitor. If running under either Windows 95 or Windows NT, a popup window will appear asking the user if he or she wishes to terminate the program. The user will select yes unless he or she wishes to scroll through the output window and look at the detection range and end of the output. If running under Windows 3.1, the DOS box disappears automatically when the program is finished.

Figure 11:
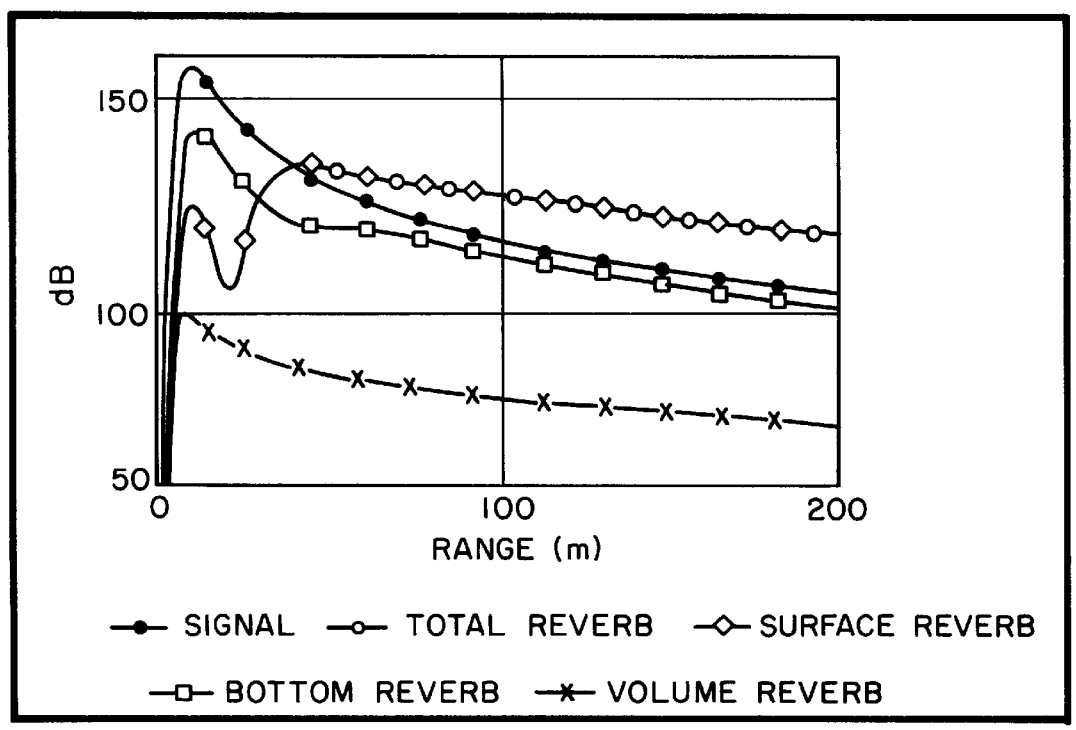

To plot the results of the simulation on the display monitor, the user selects the SNR command option from the Plot menu which was selected from the menu options displayed on the bar shown in FIG. 3. This command creates the display depicted in FIG. 11. The user unchecks the SNR check box, and selects the signal, total reverb, surface reverb, bottom reverb, and volume reverb check boxes and clicks on the OK button. This will plot these quantities in a single graph on the display monitor as seen in FIG. 11. To recast the output appearing on the display monitor into the form depicted in FIG. 11, the user selects the Y Scale option from the Edit menu. The user checks the user defined scale check box, and enters 60 for Y Min and 160 for Y Max. Then, the user clicks on the OK button. Next, the user selects the Grid option from the Edit menu and checks the x grid and y grid check boxes and clicks on the OK button. The user next selects the Replot command from the main menu. This will replot the altered graph on the display monitor, and the result should resemble FIG. 11. To print the graph to a file or a printer, the user selects the Print command from the File menu and clicks on the OK button. This will print the file to your default graphics device. To change the default graphics device, the user will use the Print Setup command.

Recapitulation

From the foregoing description, it is readily understood that the software 10 preferably has the capability to perform any one or more of the following functions, namely, to compute the SNR of the sonar, to create artificial sound velocity profiles, to create plots of the ray trajectories of the sound waves as they travel in the water, to create plots of the beam pattern of the sonar (i.e., sound intensity in different directions), to create plots of the amount of sound penetrating a sediment as a function of frequency, angle, and burial depth, and to create plots of the target strength (intensity of sound waves scattered from an object as a function of angle) for a large collection of complex targets. The SNR of the sonar is a figure of merit to determine the performance of the sonar—the higher the SNR, the easier it is for the sonar to detect the target. In general, the SNR is the ratio of the intensity of the sound scattered from the target and the intensity of sound scattering from everything else. The software 10 also includes both a context sensitive help system and an error system for bringing errors to the user's attention in a timely fashion.

Appendix A which follows contains an implementation of the source code of the software 10 for computing the SNR of the modelled sonar system. It is believed that the structure and function of the integrated sonar simulation software 10 of the present invention will be readily understood by those of ordinary skill in the art from the foregoing description with reference to the aforementioned figures of the drawings and in light of the source code of the appendix. Furthermore, it will be apparent that various changes may be made to the software without departing from the spirit and scope of the invention or sacrificing all of its material advantages, the form hereinbefore described being merely preferred or exemplary embodiment thereof.

---

Appendix A: Main Program for Narrow Band SNR Simulation

```
        implicit real*8 (a-h,o-z)
        parameter( nt_dim = 50000 )
        real*8      diarrvp(-3600:3600)
        real*8      diarrhp(-180 :180 )
        common/di2_p/ diarrvp      ,diarrhp
        real*8      diarrvr(-3600:3600)
        real*8      diarrhr(-180 :180 )
        common/di2_r/ diarrvr      ,diarrhr
c
c functions
c
        real*8      absorption
        real*8      compute_di2_p
        real*8      compute_di2_r
        real*8      compute_surf_rev
        real*8      compute_bot_rev
        real*8      compute_bot_bi
        real*8      ambient_noise
        common/sloss/ fsloss, fshft
        common/sloss_tgt/ fsloss_tgt, fshft_tgt
        PARAMETER(MAXSSP= 200) ! MAX. # OF POINTS IN SSP
        REAL*8     ZSSP      , CSSP
        COMMON/SSPCOM/ ZSSP(MAXSSP), CSSP(MAXSSP), NSSP
        REAL*8     Z0(MAXSSP), V0(MAXSSP),G0(MAXSSP),
     1       G1(MAXSSP), G2(MAXSSP)
        COMMON/ISSCOM/ Z0       ,V0       ,G0      ,
     1       G1       ,G2,       NISS
        real*8      rarr(nt_dim)
        real*8      rarrm(nt_dim)
        real*8      sarr(nt_dim)
        real*8      sarrm(nt_dim)
        real*8      snrarr(nt_dim)
        real*8      varr(nt_dim)
        real*8      srfarr(nt_dim)
        real*8      botarr(nt_dim)
        real*8      varrm(nt_dim)
        real*8      dirarr(nt_dim)
        real*8      dirarrm(nt_dim)
        real*8      srfarrm(nt_dim)
        real*8      botarrm(nt_dim)
        real*8      ln10
        real*8      L
        real*8      lprj
        real*8      lrec
        real*8      nu
        real*8      thi1(100), thf1(100), amp1(100),
                    amp2(100),time11(100)
        open(unit=3 ,file='svp.in' ,form='formatted')
        open(unit=4 ,file='pcswatm.out' ,form='formatted')
        open(unit=10,file='pcswatm.in' ,form='formatted')
        open(unit=11,file='ssp.out' ,form='formatted')
        open(unit=20,file='swlog.out' ,form='formatted')
        pi = 3.1415926535897
        rad = 180/pi
        ln10 = dlog( 10.00d0 )
        write(*,5001)
5001    format(1x,'PC SWAT 4.0'//
     x       1x,'Coastal Systems Station'/
     x       1x,'Panama City, FL'//)
        write(*,6001)
6001    format(1x,'Reading input file' /)
c
c Read Input File PCSWATM.IN
c
        read( 10, *,end = 1,err = 1 ) sl
```

---

Appendix A: Main Program for Narrow Band SNR Simulation

```
        read( 10, *,end = 1,err = 1 ) freq
        read( 10, *,end = 1,err = 1 ) Band_Width
        read( 10, *,end = 1,err = 1 ) nbands
        read( 10, *,end = 1,err = 1 ) Pulse_Length
        read( 10, *,end = 1,err = 1 ) nbeam
        read( 10, *,end = 1,err = 1 ) ihprj_user
        read( 10, *,end = 1,err = 1 ) ivprj_user
        read( 10, *,end = 1,err = 1 ) ihrec_user
        read( 10, *,end = 1,err = 1 ) ivrec_user
        read( 10, *,end = 1,err = 1 ) ihorprj_type
        read( 10, *,end = 1,err = 1 ) iverprj_type
        read( 10, *,end = 1,err = 1 ) ihorrec_type
        read( 10, *,end = 1,err = 1 ) iverrec_type
        read( 10, *,end = 1,err = 1 ) lprj
        read( 10, *,end = 1,err = 1 ) hprj
        read( 10, *,end = 1,err = 1 ) lrec
        read( 10, *,end = 1,err = 1 ) hrec
        read( 10, *,end = 1,err = 1 ) hbeamp
        read( 10, *,end = 1,err = 1 ) vbeamp
        read( 10, *,end = 1,err = 1 ) hbeamr
        read( 10, *,end = 1,err = 1 ) vbeamr
        read( 10, *,end = 1,err = 1 ) sllhp
        read( 10, *,end = 1,err = 1 ) sllvp
        read( 10, *,end = 1,err = 1 ) sllhr
        read( 10, *,end = 1,err = 1 ) sllvr
        read( 10, *,end = 1,err = 1 ) phi_steer_p
        read( 10, *,end = 1,err = 1 ) phi_mid
        read( 10, *,end = 1,err = 1 ) depth_sonar
        read( 10, *,end = 1,err = 1 ) icoherent
        read( 10, *,end = 1,err = 1 ) isas_mode
        read( 10, *,end = 1,err = 1 ) dcross_sas
        read( 10, *,end = 1,err = 1 ) drange_sas
        read( 10, *,end = 1,err = 1 ) ipitch
        read( 10, *,end = 1,err = 1 ) isonar
        read( 10, *,end = 1,err = 1 ) pitch
        read( 10, *,end = 1,err = 1 ) iscan
        read( 10, *,end = 1,err = 1 ) scanoffset
        read( 10, *,end = 1,err = 1 ) scandepth
        read( 10, *,end = 1,err = 1 ) isovelocity
        read( 10, *,end = 1,err = 1 ) water_depth
        read( 10, *,end = 1,err = 1 ) itarget_user
        read( 10, *,end = 1,err = 1 ) target_strength
        read( 10, *,end = 1,err = 1 ) depth_target
        read( 10, *,end = 1,err = 1 ) itarget_bearing
        read( 10, *,end = 1,err = 1 ) tgt_cross
        read( 10, *,end = 1,err = 1 ) tgt_bearing
        read( 10, *,end = 1,err = 1 ) iburied
        read( 10, *,end = 1,err = 1 ) depth_buried
        read( 10, *,end = 1,err = 1 ) itarget_ver
        read( 10, *,end = 1,err = 1 ) target_orient
        read( 10, *,end = 1,err = 1 ) ibot_bi
        read( 10, *,end = 1,err = 1 ) ibiot
        read( 10, *,end = 1,err = 1 ) ibot_apl
        read( 10, *,end = 1,err = 1 ) den
        read( 10, *,end = 1,err = 1 ) nu
        read( 10, *,end = 1,err = 1 ) delta
        read( 10, *,end = 1,err = 1 ) sigma
        read( 10, *,end = 1,err = 1 ) wexp
        read( 10, *,end = 1,err = 1 ) wsize
        read( 10, *,end = 1,err = 1 ) wexp3
        read( 10, *,end = 1,err = 1 ) wsize3
        read( 10, *,end = 1,err = 1 ) wmu3
        read( 10, *,end = 1,err = 1 ) wfir
        read( 10, *,end = 1,err = 1 ) dens
        read( 10, *,end = 1,err = 1 ) vl
        read( 10, *,end = 1,err = 1 ) vt
        read( 10, *,end = 1,err = 1 ) rframe
        read( 10, *,end = 1,err = 1 ) rlogL
        read( 10, *,end = 1,err = 1 ) rlogT
        read( 10, *,end = 1,err = 1 ) rlogF
        read( 10, *,end = 1,err = 1 ) porosity
        read( 10, *,end = 1,err = 1 ) permeability
        read( 10, *,end = 1,err = 1 ) wind
        read( 10, *,end = 1,err = 1 ) ifsloss
        read( 10, *,end = 1,err = 1 ) fsloss_dB
        read( 10, *,end = 1,err = 1 ) fshft
        read( 10, *,end = 1,err = 1 ) Temp
```

-continued

Appendix A: Main Program for Narrow Band SNR Simulation

```
              read( 10, *,end = 1,err = 1 ) Salinity
              read( 10, *,end = 1,err = 1 ) pH
              read( 10, *,end = 1,err = 1 ) iambient
              read( 10, *,end = 1,err = 1 ) amb_in
              read( 10, *,end = 1,err = 1 ) ivolume
              read( 10, *,end = 1,err = 1 ) ivolscat
              read( 10, *,end = 1,err = 1 ) vol_in
              read( 10, *,end = 1,err = 1 ) range_max
              read( 10, *,end = 1,err = 1 ) rprint
              read( 10, *,end = 1,err = 1 ) detect
              read( 10, *,end = 1,err = 1 ) nmul
              read( 10, *,end = 1,err = 1 ) nmtrg
              read( 10, *,end = 1,err = 1 ) idirect
              goto 2
1        continue
         write(*,901)
901      format(1x,'Error reading pcswatm.in'/)
         stop
2        continue
              L = min( lrec, lprj)
              f = freq
              rmax = range_max
              wrange = drange_sas
              wbeam = dcross_sas
              depth_sur= depth_sonar
              Salin = Salinity
C
C Initialize Surface Loss
C
              if ( ifsloss .eq. 0 ) then
                 fsloss_dB = Compute_SBL94( freq, wind, 90.0d0 )
                 fshft = .1
              endif
              fsloss     = -fsloss_dB /10*( 1 + fshft)
              fsloss tgt = -fsloss_dB /10*( 1 + fshft)
              fshft_tgt = fshft
              write(*,*) fsloss, fshft
              nmul = min( nmul, 20 )
              nmtrg = min( nmtrg, 2 )
              if ( iburied .eq. 1 ) nmtrg = 0
              if ( nmul  .eq. 0 ) idirect = 1
c
c absorption parameters
c
              d = 0
              atten = absorption( f, Temp, d, Salin, pH )
              atten = atten*ln10/10/1000 ! nepers per meter
c
c read svp
c
              write(*,6003)
6003          format(1x,'Reading SVP'/)
              if ( isovelocity .eq. 0 ) then
                 do n = 1, maxssp
                    read(3,*,end=11,err=12) z, v
                    nssp = n
                    zssp(n) = z
                    cssp(n) = v
                 end do
              else
                 nssp = 2
                 zssp(1) = 0
                 zssp(2) = water_depth
                 cssp(1) = 1.5
                 cssp(2) = 1.5001
              endif
11       continue
         goto 13
12       continue
         write(*,902)
902      format(1x,'Error reading svp file ')
         stop
13       continue
              if ( abs(zssp(1)) .gt. 1.0e-4) then
                 write(*,903)
903              format(1x,'error in svp')
                 stop
```

-continued

Appendix A: Main Program for Narrow Band SNR Simulation

```
              endif
              do n = 2, nssp
                 if ( zssp(n) .le. zssp(n-1) ) then
                    write(*,904)
904                 format(1x,'error in svp \')
                    stop
                 endif
              end do
              if ( depth_target .gt. zssp(nssp) .and. iburied .eq. 0 ) then
                 write(*,905)
905              format(1x,'depth of target gt water depth '/)
                 stop
              endif
              if ( zssp(nssp)-depth_target .lt. .1 ) then
                 depth_target = zssp(nssp) - .2
              endif
c
c Fit SVP to CONGRATS RATIONAL POLYNOMIAL
c
              call smooth_svp( )
              call fitsvp( )
              do n = 1, niss
                 write(11,9901) z0(n), 1/sqrt(v0(n)),g0(n),g1(n),g2(n)
9901             FORMAT(1X, 5D12.4)
              end do
C
C Compute/Read Beam Patterns for Projector and Receiver
C
              write(*,6002)
6002          format(1x,'Computing Beam Patterns Projector'/)
              nbar = 2
              if ( ihprj_user .eq. 1 ) then
                 open(unit=12,file='hprj.in',form='formatted')
                 do n = -180, 180
                    read(12,*,end=1201,err=1201) x, y
                    diarrhp(n) = 10**(y/20)
                 end do
                 close(12)
                 goto 1202
1201             write(*,*) 'error reading beam pattern'
                 stop
1202       continue
              else
                 call taylorh( hbeamp, nbar, sllhp, diarrhp)
              endif
              if ( ivprj_user .eq. 1 ) then
                 open(unit=12,file='vprj.in',form='formatted')
                 do n = -3600, 3600
                    read(12,*,end=1203,err=1203) x, y
                    diarrvp(n) = 10**(y/20)
                 end do
                 close(12)
                 goto 1204
1203             write(*,*) 'error reading beam pattern'
                 stop
1204       continue
              else
                 call taylorv( vbeamp, nbar, sllvp, diarrvp )
              endif
              write(*,6102)
6102          format(1x,'Computing Beam Patterns Receiver'/)
              if ( ihrec_user .eq. 1 ) then
                 open(unit=12,file='hrec.in',form='formatted')
                 do n= -180, 180
                    read(12,*,end=1205,err=1205) x, y
                    diarrhr(n) = 10**(y/20)
                 end do
                 close(12)
                 goto 1206
1205             write(*,*) 'error reading beam pattern'
                 stop
1206       continue
              else
                 call taylorh( hbeamr, nbar, sllhr, diarrhr )
              endif
              if ( ivrec_user .eq. 1 ) then
                 open(unit=12,file='vrec.in',form='formatted')
```

-continued

Appendix A: Main Program for Narrow Band SNR Simulation

```
              do n = -3600, 3600
              read(12,*,end=1207,err=1207) x, y
              diarrvr(n) = 10**(y/20)
              end do
              close(12)
              goto 1208
1207          write(*,*) 'error reading beam pattern'
              stop
1208          continue
              else
              call taylorv( vbeamr, nbar, sllvr, diarrvr )
              endif
              iprn_beam = 0
              if ( iprn_beam .eq. 1 ) then
              write(*,6103)
6103          format(1x,'Writing beam Patterns'/)
              open(unit=31,file='hprj.out' ,form='formatted')
              open(unit=32,file='vprj.out' ,form='formatted')
              open(unit=33,file='hrec.out' ,form='formatted')
              open(unit=34,file='vrec.out' ,form='formatted')
              do n = -90, 90
              th = n
              phi = 0
              sz = compute_di2_p(th,phi)
              if ( sz .gt. 0 ) then
              sz = 20*log10(sz)
              else
              sz = -100
              endif
              write(31,981) th, sz
981           format(1x, 2f16.6 )
              end do
              do n = -1800, 1800
              th = 0
              phi = n*0.05
              sz = compute_di2_p(th,phi)
              if ( sz .gt. 0 ) then
              sz = 20*log10(sz)
              else
              sz = -100
              endif
              write(32,982) phi, sz
982           format(1x, 2f16.6 )
              end do
              do n = -90, 90
              th = n
              phi = 0
              sz = compute_di2_r(th,phi)
              if ( sz .gt. 0 ) then
              sz = 20*log10(sz)
              else
              sz = -100
              endif
              write(33,983) th, sz
983           format(1x, 2f16.6 )
              end do
              do n = -1800, 1800
              th = 0
              phi = n*0.05
              sz = compute_di2_r(th,phi)
              if ( sz .gt. 0 ) then
              sz = 20*log10(sz)
              else
              sz = -100
              endif
              write(34,984) phi, sz
984           format(1x, 2f16.6 )
              end do
              endif
c
c Initialize/Read Target Strength
c
              write(*,*) 'init ts'
              if( itarget_user .eq. 0 ) then
              call init_ts_pt( target_strength )
              else
              call init_ts_user( itarget_ver )
              endif
c
c Initialize Volume Scattering Strength
c
              if ( ivolscat .eq. 1 ) then
c sparse
              vol_scat_db = -84.6
              else if ( ivolscat .eq. 2) then
c medium
              vol_scat_db = -71.6
              else
c dense
              vol_scat_db = -61.6
              endif
              if (ivolume .eq. 1 ) vol_scat_db = vol_in
              vol_scat = 10**( (vol_scat_db)/10 )
c
c Initialize Misc Variables
c
              depth_wave = zssp(nssp)
              depth_bot = depth_wave - depth_sur
              vel = cssp(1)
c
c convert to radians
c
              hbeam = hbeamr*pi/180
              vbeam = vbeamr*pi/180
c
c wave length
c
              wave_len = vel/f
c
c keep target and sonar at different depths
c
              if ( dabs( depth_target - depth_sur) .LE. .25 ) then
              depth_target = depth_sur - .25
              endif
              if( dabs(depth_target - depth_wave) .lt. .25) then
              depth_target = depth_wave - .25
              endif
c
c hor beam width ( radians)
c
              theta_beam = min( hbeamp,hbeamr )*pi/180
              ! width of beam (radians)
c
c Compute range resolution
c
              if ( isas_mode .eq. 0 ) then
              if ( icoherent .eq. 0 ) then
              drange = vel*pulse_length/2
              BT = 1
              else
              drange = vel/2/band_width
              BT = band_width*pulse_length
              endif
              else
              drange = wrange
              BT = 1
              endif
              BT = Max( BT, 1.0d0 )
              if ( drange .le. 0.2 ) then
              nsamples = 1
              else
              nsamples = drange/0.2 + 0.5
              endif
c
c Initialize ambient noise
c
              If ( iambient .eq. 0 ) then
              amb = ambient_noise( f, wind )
              else
              amb = 10**( amb_in/10 )
              endif
              amb = amb*vbeam/(4*pi)*band_width*1000
              amb_scale = amb/BT
c
```

Appendix A: Main Program for Narrow Band SNR Simulation

```
c Initialize Amplitude of Source, Reverberation
c
        Amp_src = 10.0**( SL/10 )
        Amp_vol = Amp_src
        Amp_bot = Amp_src
        Amp_srf = Amp_src
c
c Initialize range increments
        rmin = 0
        drwid = drange/nsamples
        nrmax =(rmax − rmin)/drwid + 1
        nrmax_reverb = nrmax + 50
c
c Initialize time increments
c
        r0 = min( depth_bot, depth_sur )
        tmin = 0                          ! minimum time1
        tmax = rmax                       ! maximum time1
        dtime= drwid                      ! resolution
        ntime= (tmax − tmin)/dtime        ! number of points
        ntime_reverb = nrmax_reverb
        if ( ntime_reverb .gt. nt_dim ) then
        write(*,801)
801     format(1x, 'rmax too large')
        stop
        end if
        write(*,6004)
6004    format(1x,'Initializing Reverberation Tables'/)
c
c initialize surface reverberation
c
        call init_surf_rev94(f, wind)
c
c initialize bottom reverberation and losses
c
        call init_bot_bi(den,nu,delta,wexp,wsize,sigma,
x wexp3,wsize3,wmu3)
        If ( ibot_bi .eq. 0 )then
        call init_bot_rev (f)
        call init_refl_bot( )
        else
        call init_bot_rev_bi(f)
        call init_refl_bot_bi( )
        endif
c
c initialize ray paths
c
        write(*,6005)
6005    format(1x,'Computing Ray Trajectories'/)
        call init_raysrc( depth_sur )
        write(*,6105)
6105    format(1x,'Computing Ray Trajectories to target'/)
C
C Compute Ray Paths to Target
C
        if ( iburied .eq. 0 ) then
        call init_raytrg( depth_target )
        call init_raytrg_vtx(f, nmtrg)
        else
        if( ibiot .eq. 1 ) then
call init_Biot( f,dens,vl,vt,rframe, rlogL, rlogT,rlogF,
x       porosity, permeability )
        else
        call
        init_pen_com(den,nu,delta,wexp,wsize,wexp3,wsize3,wmu3,wfir)
        call init_pen_leg(24,8)
        endif
        xk = 2*pi*f/1.5
        call init_penetration(xk, depth_buried, ibiot )
        call init_raybur_vtx(f, nmtrg)
        endif
C
C Compute Ray Paths to Surface
C
        write(*,6205)
6205    format(1x,'Computing Ray Trajectories to Surface'/)
        call init_raysrf_vtx(f,nmul, idirect)
C
C Compute Ray Paths to Bottom
C
        write(*,6305)
6305    format(1x,'Computing Ray Trajectories to Bottom'/)
        call init_raybot_vtx(f,nmul, idirect)
C
C Initialize SNR
C
        do nt = 1, ntime_reverb
        snrarr(nt) = −100
        sarrm(nt) = −100
        end do
        phi_min = phi_mid − (nbeam−1)*vbeamr/2
C
C Do Loop Over Multiple Vertical Beams
C
        do nb = 1, nbeam
        phi_steer_r = phi_min + (nb−i)*vbeamr
        write(*,8905) phi_steer_r
8905    format(1x,'D/E Receiver', f10.3)
C
C Take Into Account Pitch of Source and Receiver
C
        call rotateb(ipitch,isonar,phi_steer_p,pitch,th_p, ph_p)
        call rotateb(ipitch,isonar,phi_steer_r,pitch,th_r, ph_r)
c
c Initialize Temporary Arrays to Zero
c
        do nt = 1, ntime_reverb
        sarr(nt) = 0
        varr(nt) = 0
        srfarr(nt) = 0
        botarr(nt) = 0
        dirarr(nt) = 0
        end do
c
c Do Loop over Range
c
        do nr = 1, nrmax_reverb
        range = rmin + (nr−1)*drwid
C
C Account For Target Bearing
C
        if ( itarget_bearing .eq. 1 ) then
        bearing = tgt_bearing
        else
        if ( range .gt. 1.00d-3 ) then
        bearing = datan2( tgt_cross, range )*rad
        else
        bearing = 0
        endif
        endif
C
C Account for Possible Time Varying Receive Direction
C
        if ( iscan .eq. 1 ) then
        phi = −datan2( scandepth-depth_sonar, range )
        phi = phi*180/pi + scanoffset
        phi_steer_r = phi
        call rotateb(ipitch,isonar,phi,pitch,th_r,ph_r )
        endif
C
C Find Ray to Surface
C
        call fit_raysrf( range, nray1, thi1, thf1, amp1, time11)
        nr_srf = nray1
c
c calculate surface reverberation
c
        do nm1 = 1, nray1
        do nm2 = 1, nray1
        phi_in = thi1(nm1)
        phi_out= thi1(nm2)
        pho_in = thf1(nm1)
        pho_out= thf1(nm2)
        t_in = time11(nm1)
```

-continued

Appendix A: Main Program for Narrow Band SNR Simulation

```
            t_out = time11(nm2)
            Amp_in = amp1(nm1)
            Amp_out= amp1(nm2)
            r_in = t_in
            r_out = t_out
            r = 0.5*( r_in + r_out )
c
c calculate area
c
            if ( isas_mode .eq. 0 ) then
cc          ywid = max( theta_beam*r_out, L)
            ywid = theta_beam*r_out
            area = ywid*drange  ! area of surface ensonified
            else
            area = wbeam*drange
            endif
c
c calculate directivity index
c
            th = 0
            th_o = th
            th_i = th
            ph_o = phi_out − ph_p
            ph_i = phi_in − ph_r
            di1 = compute_di2_p(th_o, ph_o)
            di2 = compute_di2_r(th_i, ph_i)
            direct = di1*di2*di1*di2
            thetaw = 0.5*( dabs(pho_out) + dabs(pho_in) )
            ratten = dexp( -atten*(r_out+r_in) )
            dsum = compute_surf_rev( thetaw )
x              *Amp_srf*area*Amp_out*Amp_in*direct
            dsum = dsum*ratten
            r = 0.5*( r_in + r_out )
            n0 = ( r − tmin )/dtime + 1
            n1 = n0 + 1
            r0 = tmin + (n0 − 1)*dtime
            r1 = tmin + (n1 − 1)*dtime
            t1 = ( r − r0 )/dtime
            t0 = 1 − t1
            if ( n0 .ge. 1 .and. n0 .le. ntime_reverb ) then
            srfarr(n0) = srfarr(n0) + t0*dsum
            endif
            if ( n1 .ge. 1 .and. n1 .le. ntime_reverb ) then
            srfarr(n1) = srfarr(n1) + t1*dsum
            endif
            end do
            end do
C
C Find Rays to Bottom
C
            call fit_raybot( range, nray1, ndirect, thi1, thf1, amp1, time11)
            nr_bot = nray1
c
c calculate bottom reverberation
c
            do nm1 = 1, nray1
            do nm2 = 1, nray1
            phi_in = thi1(nm1)
            phi_out= thi1(nm2)
            pho_in = thf1(nm1)
            pho_out= thf1(nm2)
            t_in = time11(nm1)
            t_out =time11(nm2)
            Amp_in = amp1(nm1)
            Amp_out= amp1(nm2)
            r_in = t_in
            r_out = t_out
            r=0.5*( r_n + r_out)
c
c calculate area
c
            if( isas_mode .eq. 0 ) then
cc          ywid = max( theta_beam*r_out, L)
            ywid = theta_beam*r_out
            area = ywid*drange  ! area of surface ensonified
            else
            area = wbeam*drange
```

-continued

Appendix A: Main Program for Narrow Band SNR Simulation

```
            endif
c
c calculate directivity index
c
            th = 0
            th_o = th
            th_i = th
            ph_o = phi_out − ph_p
            ph_i = phi_in − ph_r
            di1 = compute_di2_p(th_o, ph_o)
            d12 = compute_di2_r(th_i, ph_i)
            direct = di1*di2*di1*di2
            tho = dabs(pho_out)
            thi = dabs(pho_in)
            thw = (thi+tho)/2
            if ( ibot_bi .eq. 0 ) then
            dsum = Amp_bot*compute_bot_rev( thw )
x              *area*Amp_out*Amp_in*direct
            else
            dsum = Amp_bot*compute_bot_bi( thi, tho )*area
x              *Amp_out*Amp_in*direct
            endif
            r1 = dexp( -atten*(r_out+r_in) )
            dsum = dsum*r1
            r = 0.5*( r_in + r_out )
            n0 = ( r − tmin )/dtime + 1
            n1 = n0 + 1
            r0 = tmin + (n0 − 1)*dtime
            r1 = tmin + (n1 − 1)*dtime
            t1 = ( r − r0 )/dtime
            t0 = 1 − t1
            if ( n0 .ge. 1 .and. n0 .le. ntime_reverb ) then
            botarr(n0) = botarr(n0) + t0*dsum
            if ( nm1 .eq. ndirect .and. nm2 .eq. ndirect ) then
            dirarr(n0) = dirarr(n0) + t0*dsum
            endif
            endif
            if ( n1 .ge. 1 .and. n1 .le. ntime_reverb) then
            botarr(n1) = botarr(n1) + t1*dsum
            if ( nm1 .eq. ndirect .and. nm2 .eq. ndirect ) then
            dirarr(n1) = dirarr(n1) + t1*dsum
            endif
            endif
            end do
            end do
C
C Find Rays to Target
C
            call fit_raytrg( range, nrays, thi1, thf1, amp1, amp2, time11)
c
c Find Path to Target with Max Return
c
            nm_1 = 0
            nm_2 = 0
            sig_max = 0
            t_min = 1.00e+20
            do nm1 = 1, nrays
            do nm2 = 1, nrays
            phi_in = thi1(nm1)
            phi_out= thi1(nm2)
            thi_in = thf1(nm1)
            thi_out= thf1(nm2)
            t_in = time11(nm1)
            t_out = time11(nm2)
            Amp_in = amp2(nm1)
            Amp_out= amp1(nm2)
            r_in = t_in
            r_out = t_out
            t = (t_in + t_out)/2
c
c calculate directivity index
c
            th = bearing
            call rotate(ipitch,isonar,phi_steer_p,pitch,
x              th, phi_out, th_o, ph_o )
            call rotate(ipitch,isonar,phi_steer_r,pitch,
x              th, phi_in , th_i, ph_i )
```

-continued

Appendix A: Main Program for Narrow Band SNR Simulation

```
            di1 = compute_di2_p(th_o, ph_o)
            di2 = compute_di2_r(th_i, ph_i)
            di1 = di1*di1
            di2 = di2*di2
            th = 90 - (thi_in + thi_out)/2
            ph = target_orient - bearing
            Amp_target = Amp_src*compute_ts( ph, th )
            dsum = Amp_target*Amp_out*Amp_in*di1*di2
            r1 = dexp( -atten*(r_out+r_in) )
            dsum = dsum*r1
            if ( iburied .eq. 0 ) then
            if ( dsum .gt. sig_max) then
            sig_max = dsum
            t_min = t
            sig_r = 0.5*(r_in+r_out)
            nm_1 = nm1
            nm_2 = nm2
            endif
            else
            if ( t.lt. t_min ) then
            sig_max = dsum
            t_min = t
            sig_r = 0.5*(r_in+r_out)
            nm_1 = nm1
            nm_2 = nm2
            endif
            endif
            end do
            end do
C
C Calculate Signal From Target
C
            if ( nm_1 .gt. 0 .and. nm_2 .gt. 0 ) then
            phi_in = thi1(nm_1)
            phi_out= thi1(nm_2)
            thi_in = thf1(nm_1)
            thi_out= thf1(nm_2)
            t_in = time11(nm_1)
            t_out = time11(nm_2)
            Amp_in = amp2(nm_1)
            Amp_out= amp1(nm_2)
            r_in = t_in
            r_out = t_out
c
c calculate directivity index
c
            th = bearing
            call rotate(ipitch,isonar,phi_steer_p,pitch,
x               th, phi_out, th_o, ph_o)
            call rotate(ipitch,isonar,phi_steer_r,pitch,
x               th, phi_in , th_i, ph_i )
            di1 = compute_di2_p(th_o, ph_o)
            di2 = compute_di2_r(th_i, ph_i)
            di1 = di1*di1
            di2 = di2*di2
            th = 90 - (thi_in + thi_out)/2
            ph = target_orient - bearing
            Amp_target = Amp_src*compute_ts( ph, th )
            dsum = Amp_target*Amp_out*Amp_in*di1*di2
            r1 = dexp( -atten*(r_out+r_in) )
            dsum = dsum*r1
            r = 0.5*( r_in + r_out)
C
C Calculate volume scattering
C
            if ( isas_mode .eq. 0 ) then
            dvol = hbeam*vbeam*drange*r*r
            else
            dvol = dcross_sas/(r+1)*vbeam*drange*r*r
            end if
            vol = Amp_vol*vol_scat*dvol*r1/(r+1)**4
            n0 = ( r - tmin )/dtime + 1
            n1 = n0 + 1
            ntrg = n0
            r0 = tmin + (n0 - 1)*dtime
            r1 = tmin + (n1 - 1)*dtime
            t1 = ( r - r0 )/dtime
            t0 = 1 - t1
            if ( n0 .ge. 1 .and. n0 .le. ntime_reverb ) then
            varr(n0) = varr(n0) + t0*vol
            sarr(n0) = sarr(n0) + t0*dsum
            rarr(n0) = range
            endif
            if ( n1 .ge. 1 .and. n1 .le. ntime_reverb ) then
            varr(n1) = varr(n1) + t1*vol
            sarr(n1) = sarr(n1) + t1*dsum
            endif
C
C Write Preliminary SNR to Screen
C
            nr_par = nr - 50*(nr/50)
            if ( nr_par .eq. 0 ) then
            nsrf = nr_srf**2
            nbot = nr_bot**2
            nt = nrays**2
cc
            if ( isas_mode .eq. 0 ) then
            endif
            if ( sig .gt. 1.0e-5 ) then
            sig = 10*log10(sig)
            else
            sig = -100
            endif
            if (con .gt. 1.0e-2 ) then
            con = 10*log10(con)
            else
            con = -20
            endif
            if( range .gt. rlast + rprint) then
            rlast = range
            write(4,911) range,snr, sig, rev, srf, bot, vol, rnoise, con,t
911         format(1x, 11f16.3)
            end if
            if ( range .gt. 0 .and. snr .gt. detect ) then
            rdetect = range
            sdetect = snr
            endif
            end do
            write(*,802) rdetect, sdetect
802         format(1x,'detection range', f16.6, 'snt', f16.6, /)
            stop
            end
            ambient = amb_scale*hbeam
            else
            ambient = dcross_sas/(r+1)*amb_scale
            end if
            sig= sarr(ntrg)
            rev= srfarr(ntrg)+botarr(ntrg)+varr(ntrg)+ambient
            snr= sig/(dabs(rev) + 1.0e-10)
cc
cc
            if( snr .gt. 1.0d-5 ) then
            snr = 10*log10(snr)
            else
            snr=-100
            endif
cc
            write(*,9907) range, nsrf, nbot, nt, snr
9907        format(1x,'range',f6.0,'sur', i6,
x               'bot',i6,
x               'tgt', i6,
x               'snr', f10.2)
            endif
            end if
            end do
c
c calculate SNR
c
            do ns = 1, ntime_reverb
            r = tmin + (ns-1)*dtime
C
C Calculate Ambient Noise as a Function of Range
C
            if ( isas_mode .eq. 0 ) then
```

Appendix A: Main Program for Narrow Band SNR Simulation

```
            ambient = amb_scale*hbeam
        else
            ambient = dcross_sas/(r+1)*amb_scale
        end if
            range = rarr(ns)
            sig = sarr(ns)
            vol = varr(ns)
            srf = srfarr(ns)
            bot = botarr(ns)
            dir = dirarr(ns)
            rev = srf + bot + vol
            snr = sig/( rev + ambient + 1.00e-20)
            if ( snr .gt. 1.0e-10 ) then
            snr = 10*dlog10( snr )
            else
            snr = -200
            endif
C
C Determine Beam with Max SNR at Given Range
C
            if ( sig .gt. sarrm(ns) ) then
              snrarr(ns) = snr
              sarrm(ns) = sig
              varrm(ns) = vol
              botarrm(ns) = bot
              srfarrm(ns) = srf
              dirarrm(ns) = dir
              rarrm(ns) = range
            endif
        end do
        end do
        rdetect = 0
        sdetect = 0
        rlast = 0
C
C Output SNR Reverb . . . to File PCSWATM.OUT
C
        do ns = 1, ntime
            t = tmin + (ns-1)*dtime
            r = t
            if ( isas_mode .eq. 0 ) then
            ambient = amb_scale*hbeam
            else
            ambient = dcross_sas/(r+1)*amb scale
            end if
            rnoise = 10*log10( ambient + 1.00e-10 )
            range = rarrm (ns)
            snr = snrarr(ns)
            sig = sarrm(ns)
            vol = varrm(ns)
            srf = srfarrm(ns)
            bot = botarrm(ns)
            dir = dirarrm(ns)
            rev = srf + bot + vol
            con = (rev + ambient)/(abs(rev + ambient - dir) + 1.00e-10)
            if ( rev .gt. 1.0e-5 ) then
            rev = 10*log10(rev)
            else
            rev = -100
            endif
            if ( srf .gt. 1.0e-5 ) then
            srf = 10*log10(srf)
            else
            srf = -100
            endif
            if ( bot .gt. 1.0e-5 ) then
            bot = 10*log10(bot)
            else
            bot = -100
            endif
            if ( vol .gt. 1.0e-5 ) then
            vol = 10*log10(vol)
            else
            vol = -100
```

I claim:

1. Computer-readable software stored on a storage medium for causing a computer to perform an integrated sonar simulation, said software comprising:

(a) a parameter definition code for defining a plurality of parameters of a sonar, target and sonar environment, said parameters including ambient noise, volume scattering strength of the sonar environment, sound velocity profile of the sonar, beam patterns of both a projector and receiver of the sonar, type of sonar, and range resolution of the sonar; and (b) a signal-to-noise ratio (SNR) computation code for computing a SNR of the sonar as a function of range to target, based upon said parameters defined by said parameter definition code; and (c) performing a simulation based on calculations of steps (a) and (b) to generate an output indicating SNR vs Range for an output device.

2. The software of claim 1 wherein said parameters also include the number of eigenrays which strike the surface and bottom of the sonar environment and which strike the target, ray trajectories to the target, and surface and bottom scattering strength as a function of angle.

3. The software of claim 2 wherein said volume scattering strength is calculated in accordance with user-input data regarding density of marine life in the sonar environment.

4. The software of claim 2 wherein said parameter definition code uses a selected one of bistatic and monostatic models of surface and bottom reverberations in respectively computing said surface and bottom scattering strengths as functions of angle.

5. The software of claim 4 wherein sedimentary composition of the bottom of the sonar environment is preferably taken into account in computing the bottom scattering strength.

6. The software of claim 2 wherein said parameter definition code preferably a Biot model of different marine sediments to account for bottom penetration to a buried target, in computing ray trajectories to the buried target.

7. The software of claim 2 wherein said SNR computation code computes said SNR of the sonar by computing the signal level of each vertical beam of the receiver of the sonar, and then by using the vertical beam having the highest signal level in calculating said SNR of the sonar.

8. The software of claim 7 wherein said SNR computation code computes a set of time-varying parameters for each vertical beam of the receiver, including volume reverberation, surface reverberation, total bottom reverberation, and bottom reverberation due to direct path only.

9. The software of claim 8 wherein said SNR computation code computes said SNR of the sonar for each of a plurality of target ranges.

10. The software of claim 9 wherein incremental difference between successive ones of said target ranges is equal to said range resolution of the sonar.

11. The software of claim 10 further comprising:

a target strength model generating code for computing scattering from a selected complex target of a stored set of complex target selections, to thereby generate a target strength model for the selected complex target.

12. The software of claim 11 wherein said target strength model generating code computes scattering from the selected complex target by:

decomposing the complex target into a large collection of rectangular facets which represent the overall shape of the complex target, the edges of the complex target, and a number of point scatterers which represent small protrusions of the complex target;

calculating the pressure scattered from each facet, edge and point scatterer; and coherently summing the calculated pressure contributions.

13. The software of claim 1 wherein said S/N computation code takes multipath reflections of transmitted and echo sound waves into account in computing said SNR of the sonar.

14. A computer-implemented method for performing an integrated sonar simulation, comprising the steps of:
  (a) providing in a storage medium a computer-readable software defining:
    (i) a parameter definition code for defining a plurality of parameters of a sonar, target and sonar environment, said parameters including ambient noise, volume scattering strength of the sonar environment, sound velocity profile of the sonar, beam patterns of both a projector and receiver of the sonar, type of sonar, and range resolution of the sonar, and
    (ii) a signal-to-noise ratio (SNR) computation code for computing a SNR of the sonar as a function of range to target, based upon said parameters defined by said parameter definition code,
  (b) inputting said plurality of parameters of the sonar, target and sonar environment into a computer by utilizing said parameter definition code of said computer-readable software,
  (c) computing said SNR of the sonar by executing said SNR computation code on the computer, and
  (d) performing a simulation based on calculations of step (c) to generate an output indicating SNR vs Range for an output device.

15. The method of claim 14 wherein said parameters also include the number of eigenrays which strike the surface and bottom of the sonar environment and which strike the target, ray trajectories to the target, and surface and bottom scattering strength as a function of angle.

16. The method of claim 15 wherein said volume scattering strength is calculated in accordance with user-input data regarding density of marine life in the sonar environment.

17. The method of claim 15 wherein said parameter definition code uses a selected one of bistatic and monostatic models of surface and bottom reverberations in respectively computing said surface and bottom scattering strengths as functions of angle.

18. The method of claim 15 wherein sedimentary composition of the bottom of the sonar environment is preferably taken into account in computing the bottom scattering strength.

19. The method of claim 15 wherein said parameter definition code includes a Biot model of different marine sediments to account for bottom penetration to a buried target, in computing ray trajectories to the buried target.

20. The method of claim 15 wherein said SNR computation code takes multipath reflections of transmitted and echo sound waves into account in computing said SNR of the sonar.

21. The method of claim 15 wherein said SNR computation code computes said SNR of the sonar by computing the signal level of each vertical beam of the receiver of the sonar, and then by using the vertical beam having the highest signal level in calculating said SNR of the sonar.

22. The method of claim 21 wherein said SNR computation code computes a set of time-varying parameters for each vertical beam of the receiver, including volume reverberation, surface reverberation, total bottom reverberation, and bottom reverberation due to direct path only.

23. The method of claim 22 wherein said SNR computation code computes said SNR of the sonar for each of a plurality of target ranges.

24. The method of claim 23 wherein incremental difference between successive ones of said target ranges is equal to said range resolution of the sonar.

25. The method of claim 23 further comprising:
  a target strength model generating code for computing scattering from a selected complex target of a stored set of complex target selections, to thereby generate a target strength model for the selected complex target.

26. The method of claim 25 wherein said target strength model generating code computes scattering from the selected complex target by:
  decomposing the complex target into a large collection of rectangular facets which represent the overall shape of the complex target, the edges of the complex target, and a number of point scatterers which represent small protrusions of the complex target;
  calculating the pressure scattered from each facet, edge and point scatterer; and
  coherently summing the calculated pressure contributions.

* * * * *